United States Patent
Al-Owaidh et al.

(10) Patent No.: US 11,886,157 B2
(45) Date of Patent: Jan. 30, 2024

(54) OPERATIONAL OPTIMIZATION OF INDUSTRIAL STEAM AND POWER UTILITY SYSTEMS

(71) Applicant: Saudi Arabian Oil Company, Dhahran (SA)

(72) Inventors: Mana Mohammed Al-Owaidh, Dhahran (SA); Abdulrahman M. Hazazi, Dammam (SA); Solomon C. Oji, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/691,747

(22) Filed: Mar. 10, 2022

(65) Prior Publication Data

US 2023/0288891 A1   Sep. 14, 2023

(51) Int. Cl.
*G05B 19/042* (2006.01)

(52) U.S. Cl.
CPC .... *G05B 19/042* (2013.01); *G05B 2219/2639* (2013.01)

(58) Field of Classification Search
CPC .............. G05B 19/042; G05B 2219/2639
See application file for complete search history.

(56) References Cited

U.S. PATENT DOCUMENTS

| | | |
|---|---|---|
| 4,628,462 A | 1/1986 | Putnam |
| 6,785,592 B1 | 8/2004 | Smith et al. |
| 7,039,575 B2 | 5/2006 | Juneau |
| 7,222,111 B1 | 5/2007 | Budike, Jr. |
| 9,436,168 B2 | 9/2016 | Yasni |
| 9,612,635 B2 | 4/2017 | Noureldin et al. |
| 9,734,479 B2 | 8/2017 | Schmitt et al. |

(Continued)

FOREIGN PATENT DOCUMENTS

WO   WO 2016114736   7/2016

OTHER PUBLICATIONS

PCT International Search Report and Written Opinion in International Appln No. PCT/US2023/014698, dated Aug. 17, 2023, 13 pages.

*Primary Examiner* — Michael W Choi
(74) *Attorney, Agent, or Firm* — Fish & Richardson P.C.

(57) ABSTRACT

Operational optimization of an industrial plant that implements steam and power systems and that includes multiple equipment including a cogeneration system and a steam turbine includes, for each equipment, a computer system receives, during operation of each equipment, measured operational physical parameter values output by the equipment during operation. The computer system determines mass balance and energy balance parameters associated with the equipment using the received operational physical parameter values. The computer system validates an operation of the equipment using the determined mass balance and energy balance parameters. After validating mass balance and energy balance parameters for all the equipment, the computer system determines mass balance and energy balance parameters associated with the industrial plant using the parameters for each equipment. The computer system validates an operation of the plant using the determined mass balance and energy balance parameters associated with the industrial plant.

23 Claims, 13 Drawing Sheets

FIG. 1

(56) References Cited

U.S. PATENT DOCUMENTS

| | | |
|---|---|---|
| 9,760,099 B2 | 9/2017 | Noureldin et al. |
| 2004/0102924 A1 | 5/2004 | Jang |
| 2008/0208429 A1 | 8/2008 | Jarrell et al. |
| 2015/0275688 A1* | 10/2015 | Barenbrügge ............ F01K 5/02 73/112.02 |
| 2016/0281607 A1* | 9/2016 | Asati ......................... F02C 7/26 |
| 2017/0364043 A1* | 12/2017 | Ganti ..................... G05B 17/02 |
| 2019/0072920 A1 | 3/2019 | Ali et al. |
| 2021/0108539 A1 | 4/2021 | Saravanapriyan et al. |
| 2021/0224708 A1 | 7/2021 | Le et al. |
| 2022/0011730 A1* | 1/2022 | Langenstein ........... G06F 30/20 |
| 2022/0215138 A1* | 7/2022 | Amthor ................. G05B 17/02 |

* cited by examiner

OPERATIONAL OPTIMIZATION OF INDUSTRIAL STEAM AND POWER UTILITY SYSTEMS

TECHNICAL FIELD

This disclosure relates to computer-implemented methods, computer-readable media and computer systems implementing energy management, particularly energy management of industrial steam power and utility systems.

BACKGROUND

In industrial operations, e.g., industrial steam power and utility systems, different types of processes consume multiple steam levels, electricity and other forms of energy to obtain an output result, or to produce a required product or compound. For large-scale processes that consume significant amounts of steam, efficiencies can be achieved by optimizing the consumption of energy through careful operation, design or reconfiguration of the plant and the equipment used. Accurate and timely measurement of operational parameters of each equipment in the plant can enable such optimization.

SUMMARY

This disclosure describes computer-implemented methods, computer-readable media and computer systems that can optimize operation of industrial steam and power utility systems.

Certain aspects of the subject matter described here can be implemented as a computer-implemented method. The method is implemented in an industrial plant that implements steam and power systems. The industrial plant includes multiple equipment including a cogeneration system and a steam turbine. For each equipment, a computer system receives, during operation of each equipment, measured operational physical parameter values output by the equipment during operation. The computer system determines mass balance and energy balance parameters associated with the equipment using the received operational physical parameter values. The computer system validates an operation of the equipment using the determined mass balance and energy balance parameters. After validating mass balance and energy balance parameters for all the equipment, the computer system determines mass balance and energy balance parameters associated with the industrial plant using the parameters for each equipment. The computer system validates an operation of the plant using the determined mass balance and energy balance parameters associated with the industrial plant.

An aspect combinable with any other aspect includes the following features. For each equipment, validating the operation of the equipment using the determined mass balance and energy balance parameters is implemented as a level in a multi-level validation process. The multi-level validation process includes verifying that each measured operational physical parameter value output by the equipment during the operation of the equipment is within a threshold physical parameter value range associated with the equipment.

An aspect combinable with any other aspect includes the following features. The multi-level validation process includes comparing each measured operational physical parameter value output by the equipment during the operation of the equipment with stored historical data including historically measured operational physical parameter values output during past operations of the equipment.

An aspect combinable with any other aspect includes the following features. The multi-level validation process includes, based on a result of verifying that each measured operational physical parameter value output by the equipment during the operation of the equipment is within the threshold physical parameter value range associated with the equipment, and based on comparing each measured operational physical parameter value output by the equipment during the operation of the equipment with stored historical data including historically measured operational physical parameter values output during past operations of the equipment, classifying each measured operational physical parameter value as a value that accurately represents an operational stage of the equipment or as a value that comparatively less accurately represents the operational state of the equipment.

An aspect combinable with any other aspect includes the following features. Verifying that each measured operational physical parameter value output by the equipment during the operation of the equipment is within a threshold physical parameter value range associated with the equipment is a first level of the multi-level validation process. Classifying each measured operational physical parameter value is a last level of the multi-level validation process.

An aspect combinable with any other aspect includes the following features. To validate the operation of the industrial plant using determined mass balance and energy balance parameters associated with the industrial plant, it is determined, using the mass balance and energy balance parameters associated with the industrial plant, that the industrial plant is operating outside threshold parameters associated with the industrial plant. In response to determining that the industrial plant is operating outside the threshold parameters, a level to which a physical process input to one or more of the equipment is to be modified to cause the industrial plant to operate within the threshold parameters is determined. Instructions are transmitted to cause an operation of the physical process to be modified to the determined level.

An aspect combinable with any other aspect includes the following features. The physical process is flow of steam to one or more of the equipment of the multiple equipment. The level to which the physical process is to be modified includes a change in a flow rate at which the steam is flowed to the equipment.

An aspect combinable with any other aspect includes the following features. For each equipment, results of validating the operation of the equipment using the determined mass balance and energy balance parameters in a user interface displayed on a computer monitor operatively connected to the computer system. Results of validating the operation of the industrial plant using the determined mass balance and energy balance parameter associated with the industrial plant are displayed on the computer monitor.

An aspect combinable with any other aspect includes the following features. Validating the operation of each equipment of the multiple equipment and validating the operation of the industrial plant is implemented at a frequency. The displayed results of validating the operation of the equipment and the displayed results of validating the operation of the industrial plant are updated on the computer monitor at the frequency.

Certain aspects of the subject matter described here can be implemented as a computer-readable medium (e.g., non-transitory computer-readable medium) storing instructions executable by one or more computers or computer systems perform the methods described here. Certain aspects of the subject matter described here can be implemented as a computer system including one or more computers or computer systems, and a computer-readable storage medium (e.g., non-transitory computer-readable storage medium) storing computer instructions executable by the one or more computers or computer systems to perform the operations described here.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
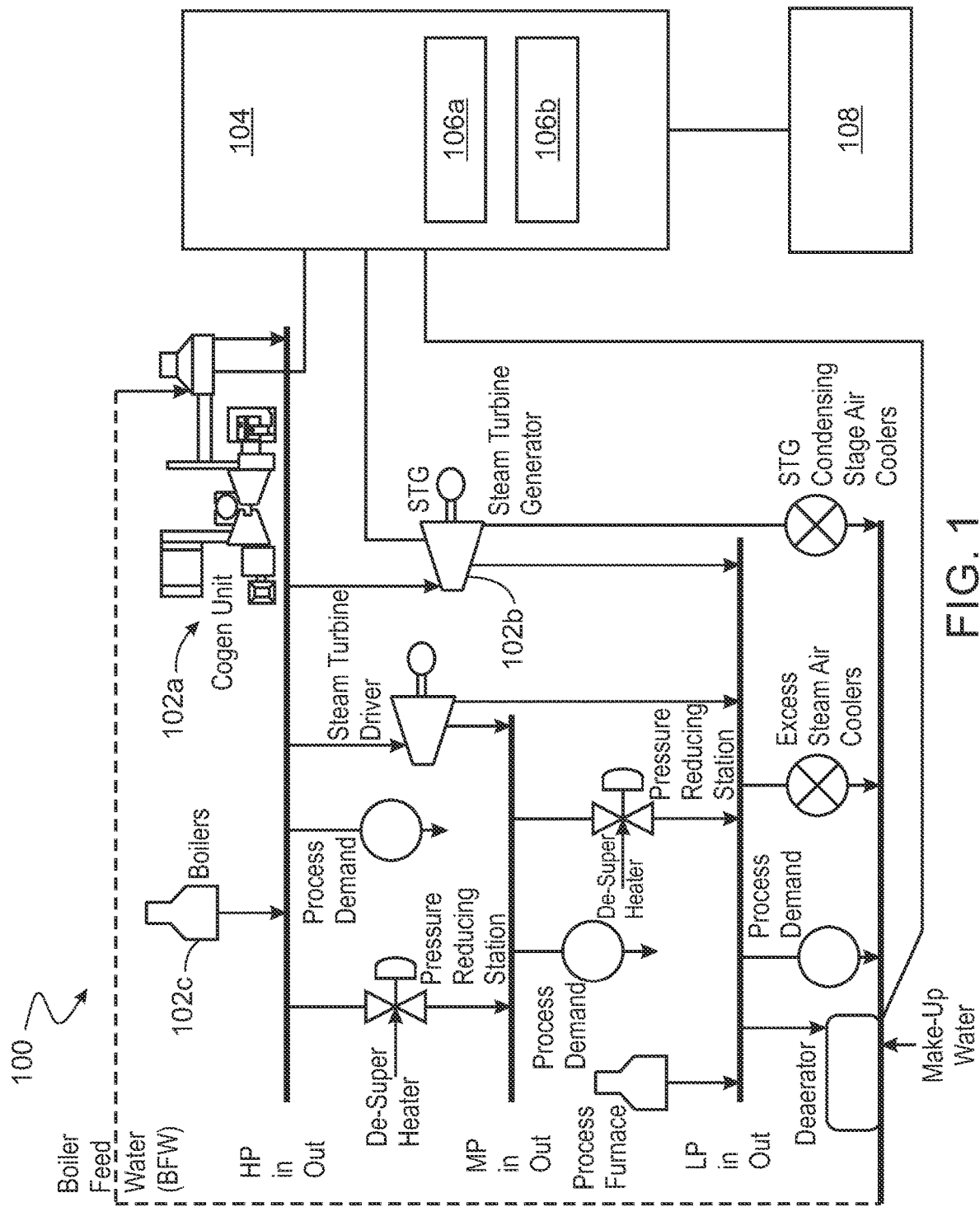
FIG. 1 is a schematic representation of an industrial steam power and utility system that operates multiple equipment.

This disclosure describes a real-time advisory system for industrial steam and power utility systems. Optimum operation of such industrial steam and power utility systems helps to lower operating cost, increase operational efficiency and lower carbon dioxide emissions. One challenge when implementing such advisory systems is the accuracy of real-time data due to missing instrumentation or uncalibrated measurements. This disclosure describes techniques that overcome the challenges by implementing the advisory systems despite the absence of instrumentation or incorrect/improper calibration of measurements. To do so, this disclosure describes techniques that use real-time operational data, thermodynamic properties, and energy correlations that represent equipment of the industrial steam and power utility systems.

By considering constraints such as closing material balances and energy balances, first, at the equipment level, and then at the system level, the disclosure describes a base-case operation and an optimized case operation. In these operations, operational physical parameter values received from each equipment and corresponding values for the system as a whole are compared against maximum and minimum operating limits as well as steam and power reserve requirements. Equipment and system validation are performed using results of the comparison. The results are also used to adjust operational physical parameters of the equipment to optimize performance and operation of each equipment and that of the industrial power and utility system. The measurements and the results of the comparison are presented, via user interfaces displayed on computer monitors, to users (e.g., plant or equipment operators) in real-time to allow the users to adjust the operational physical parameters. In some instances, the measurements and the results of the comparison can be used to automatically adjust the operational physical parameters (e.g., by transmitting computer instructions to the equipment) without human intervention.

The techniques described in this disclosure can be implemented to achieve one or more of the following advantages. The techniques represent a simple, yet accurate real-time advisory model that can provide meaningful recommendations with potential benefits. Implementing the techniques provides plant operators with operational set points even if the plant has limitations on key measurements. The techniques described here negate the need to have a complete set of measurements to close steam's heat and mass balance. The techniques provide a real-time closed loop optimization that, while inexpensive, is nevertheless reliable and accurate. The techniques capitalize on a methodology that addresses metering and measurements issues of industrial steam and power utility systems, provides recommended actions to realize energy savings, improve system efficiency and reduce carbon dioxide, and, in some instances, implements the recommended actions without human intervention.

FIG. 1 is a schematic representation of an industrial steam power and utility system 100 (sometimes referred to as "an industrial plant") that operates multiple equipment including, for example, a cogeneration unit 102a, a steam turbine 102b, boilers 102c and others. The list below shows legends of abbreviations shown in FIG. 1.

BFW: Boiler feed water flow rate
BD: blow down flow rate
CC: cycle of concentration of blow down
STM: steam flow rate
H_: Enthalpy
HHV: Fuel high heating value
SF: Supplementary firing flow rate
GT_load: Gas turbine % of load
W_rated_adj: degradation factor for gas turbine power out comes
S_eff: Steam turbine isentropic efficiency
MAX_W: maximum power output at S_eff=100%
W: is the actual work from an equipment (i.e. Cogen, steam turbine and others)
H_OUT: Enthalpy Out
H_IN: Enthalpy for Inlet
H_ise: Isentropic Enthalpy
H_OUT_M: Enthalpy Out for MP extraction stage
H_OUT_L: Enthalpy Out for LP extraction stage H_OUT_C: Enthalpy Out for a condensing stage
X_C: steam quality of the steam existing steam turbine condensing stage
P_OUT_C: pressure of steam at the condensing stage
CR: Process Condensate return factor Each equipment implements a process or processes, and the system 100 collectively implements all the equipment to convert steam into energy. While implementing the process or processes, each equipment outputs an operational physical parameter value. For example, the operational physical parameter can include temperature, pressure, flow rate or similar parameters experienced by the equipment. The operational physical parameter is a value representative of the corresponding parameter, e.g., a temperature value, a pressure value, a flow rate value. Multiple sensors (not shown) can be operatively coupled to each equipment to measure the operational physical parameters. The sensors (e.g., thermocouple to sense a temperature value, pressure gauge to sense a pressure value, flow meter to sense a flow rate value, and similar sensors) can transform the sensed physical parameters into digital signals, and transmit the signals to a destination.

In some implementations, the system 100 is operatively coupled to a computer system 104 that includes one or more data processing apparatus 106a (e.g., one or more data processors) and a computer-readable medium 106b (e.g., a non-transitory computer-readable medium) storing computer instructions executable by the one or more data processing apparatus 106a to perform the operations described here. For each equipment in the system 100, the computer system 104 receives operational physical parameter values measured by sensors mounted on the equipment during operation of the equipment. For example, the computer system 104 receives the digital signals representing sensed operational physical parameter values measured by the sensors. The computer system 104 can store the received signals to implement the processing described below.

In some implementations, the computer system 104 can use the received operational physical parameter values to determine mass balance and energy balance parameters associated with the equipment from which the operational physical parameter values were received. Using the determined mass balance and energy balance parameters, the computer system 104 can validate an operation of the equipment. Such validation can include comparing the mass balance and energy balance parameters determined for the equipment against threshold mass balance and energy balance parameters. If the results of the comparison reveal that the threshold parameters are satisfied, the operation of the equipment is validated as being satisfactory. To the contrary, if the results reveal that the threshold parameters are not satisfied, the operation of the equipment is validated as being unsatisfactory. Determining such parameters includes processing the received values as described below with reference to FIGS. 4-12. In this manner, the computer system 104 can implement validation operations on each equipment in the system 100.

In some implementations, after validating an operation of each equipment in the system 100 using the determined mass balance and energy balance parameters determined for each equipment, the computer system 104 can validate an operation of the system 100 as a whole. To do so, the computer system 104 can determine mass balance and energy balance parameters associated with the system 100 using the mass balance and energy balance parameters associated with each equipment. Using the determined mass balance and energy balance parameters determined for the system 100, the computer system 104 can validate an operation of the system 100 as a whole. Such validation can include comparing the mass balance and energy balance parameters determined for the system 100 against system-wide threshold mass balance and energy balance parameters. If the results of the comparison reveal that the threshold parameters are satisfied, the operation of the system 100 is validated as being satisfactory. To the contrary, if the results reveal that the threshold parameters are not satisfied, the operation of the system 100 is validated as being unsatisfactory.

Figure 2:
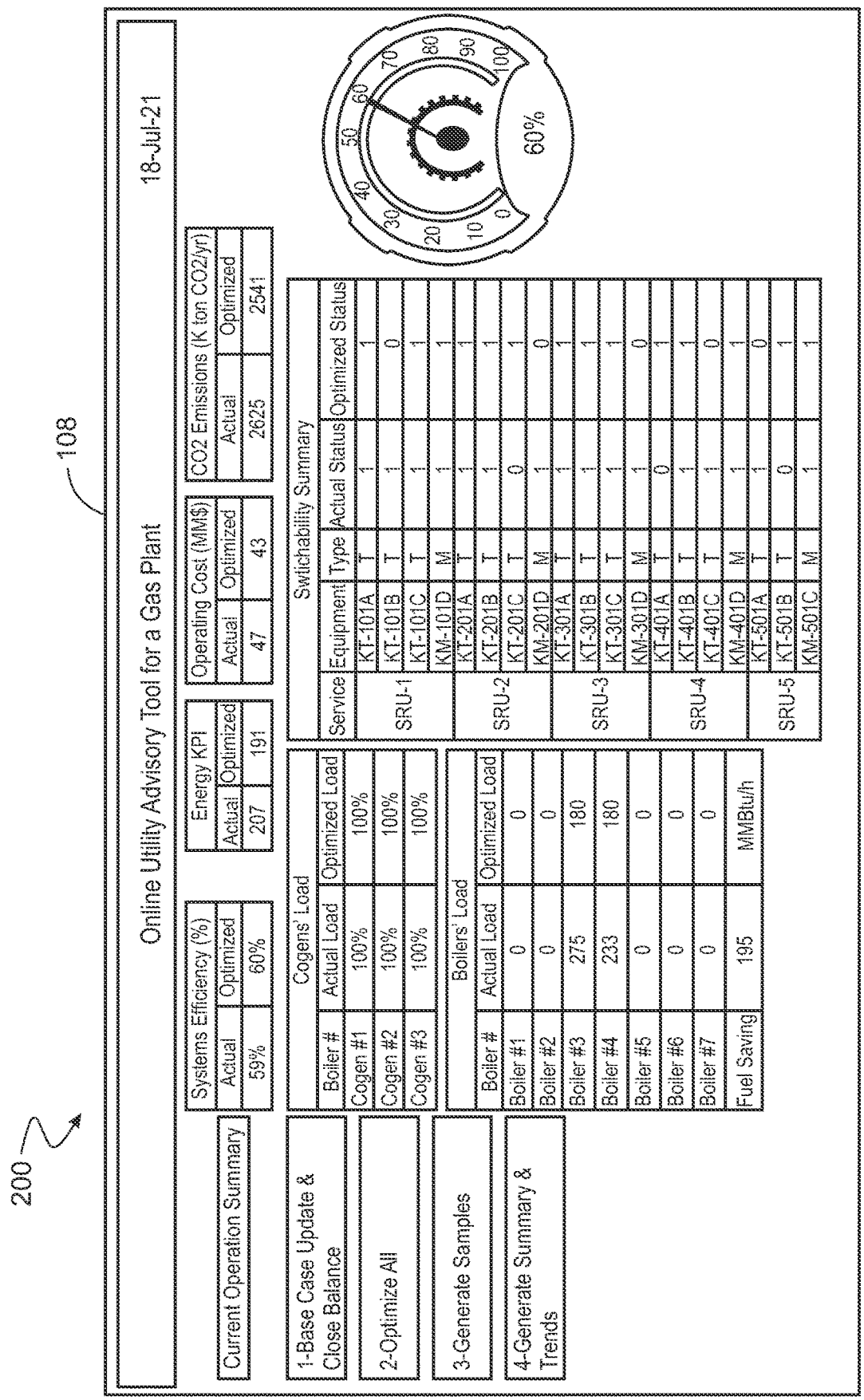
FIG. 2 is a schematic representation of a user interface displayed on a computer monitor.

In some implementations, the computer system 104 is operatively coupled to a computer monitor 108. Real-time outputs of the determination and validation operations can be displayed in the computer monitor 108. FIG. 2 is a schematic representation of a user interface 200 displayed on the computer monitor 108. The "Current Operation Summary" portion discloses a procedure to run the online optimization system. The procedure can be run automatically at a frequency, e.g., once an hour. The "System Efficiency" portion shows supply side thermal efficiency for actual operation and optimized case. The "Cogens' Load" portion shows loading (actual operation and optimized case) for the cogeneration system. The "Boilers' Load" portion shows loading (actual operation and optimized case) for the boiler system. The "Energy KPI" portion shows energy intensity KPI (key performance indicator) for actual operation and optimized case. The "Operating Cost" portion shows the operating cost for actual operation and optimized case. The "CO2 Emissions" portion shows carbon dioxide emission for actual operation and optimized case.

Figure 3:
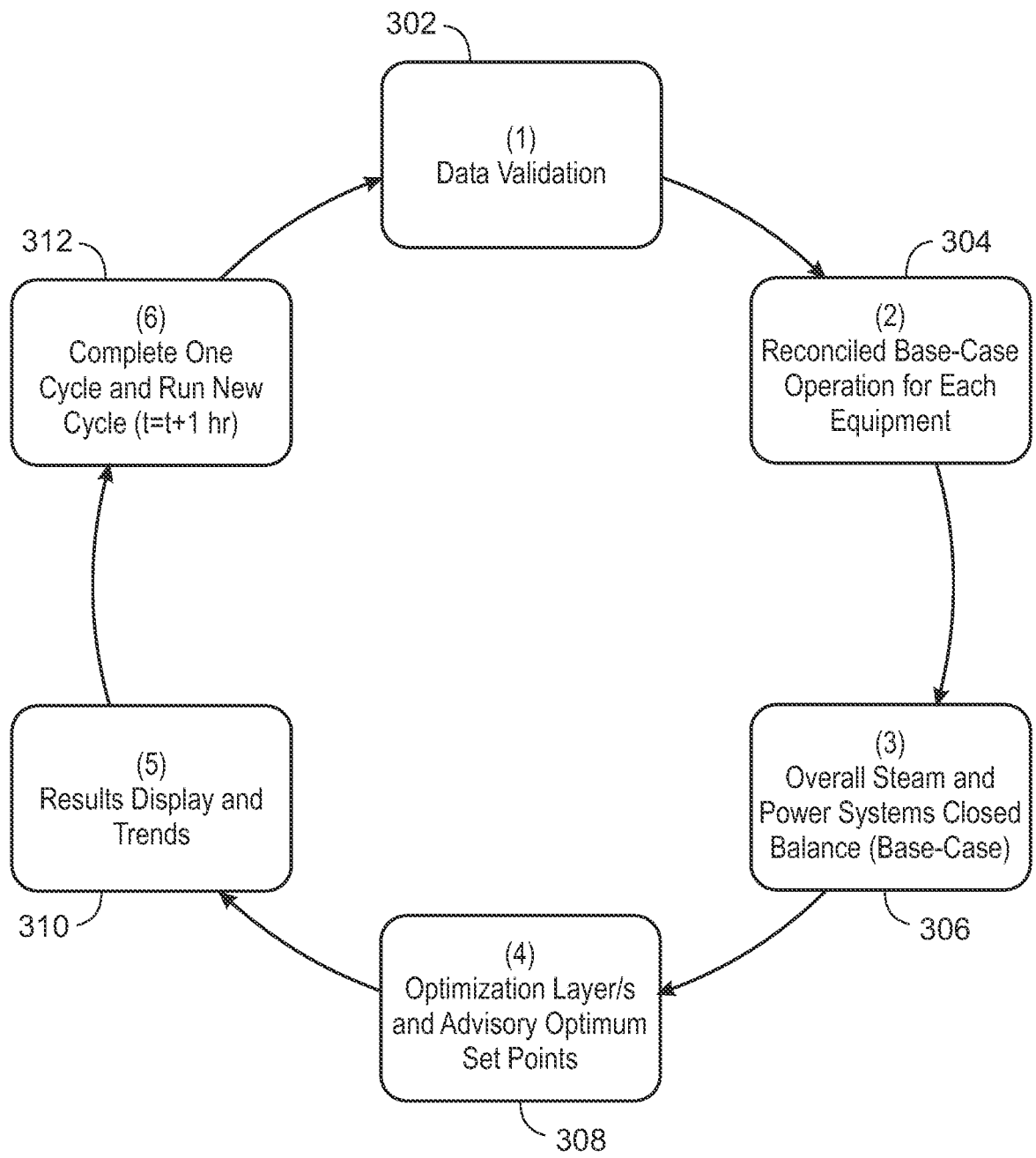
FIG. 3 is a schematic representation of optimization operations implemented by a computer system on the industrial steam power and utility system.

FIG. 3 is a schematic representation of optimization operations implemented by the computer system 104 on the system 100. FIG. 3 shows that the optimization operations are cyclical. For example, at step 302, the computer system 104 implements the data validation operations at the equipment level. The computer system 104 performs step 302 for each equipment in the system 100. In some implementations, the computer system 104 can implement the data validation operations for all the equipment in parallel. At step 304, after implementing the data validation operation for all the equipment in the system 100, the computer system 104 reconciles base-case operation for each equipment. At step 306, the computer system 104 implements mass balance and energy balance for the overall system 100. Optionally, at step 308, the computer system 104 implements optimization and identifies advisory optimum set points for the system 100 as a whole using results of the prior steps. At step 310, the computer system 104 displays the results of performing the prior steps including any output and trends, for example, in the computer monitor 108.

At step 312, the computer system 104 repeats the cycle of steps 302, 304, 306, 308 and 310. In some implementations, the computer system 104 can repeat the cycle at a frequency, for example, once per hour, or once per a different duration that can be varied in response to user input. In this manner, the computer system 104 can periodically monitor the system 100, both at an equipment level and at a system-wide level, implement validation and optimization measures, and provide outputs of the validation and optimization for display in a user interface. Examples of validation are described with reference to FIGS. 4-11.

Figure 4:
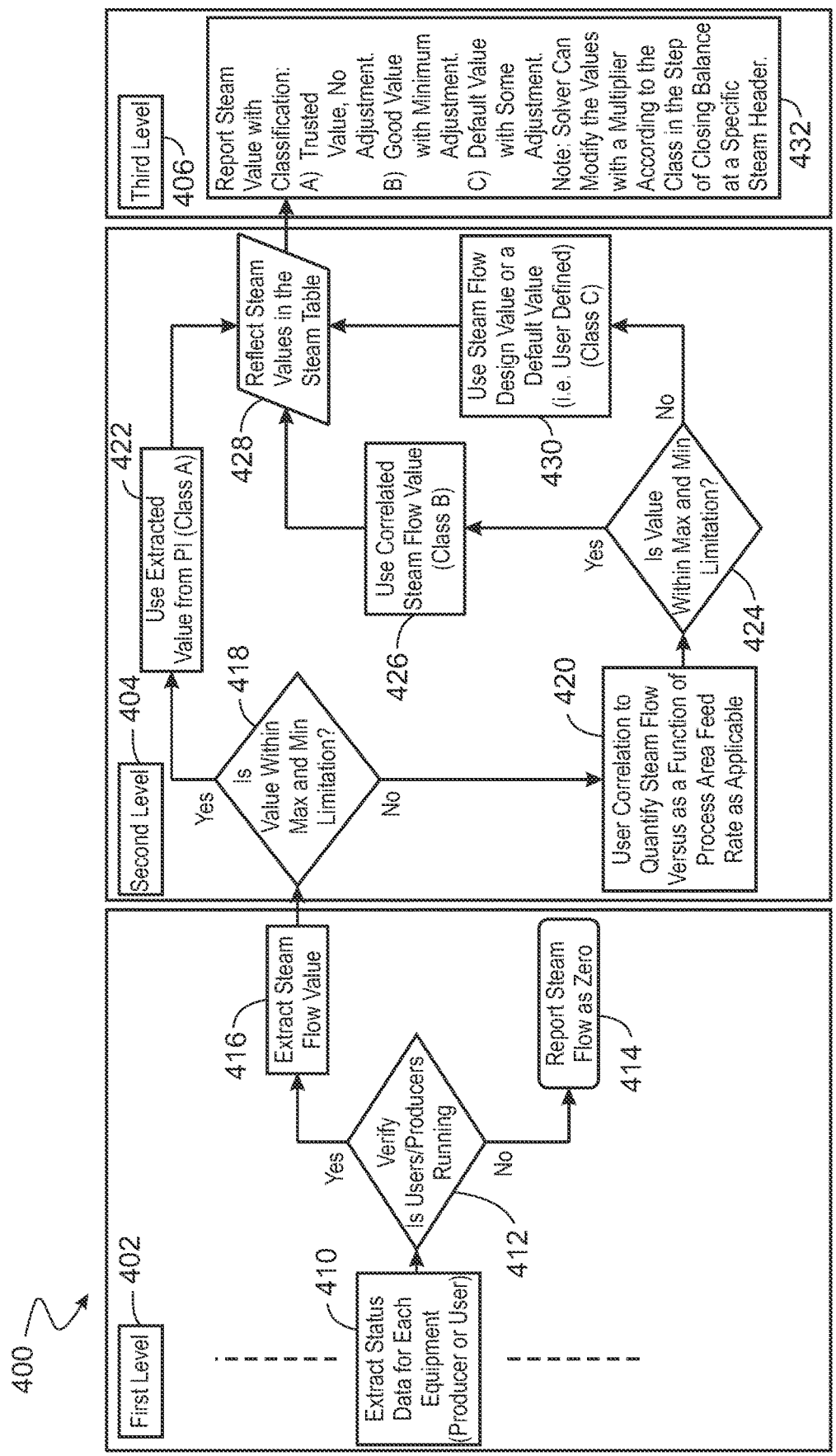
FIG. 4 is a workflow showing an example data validation procedure for an equipment in the industrial steam power and utility system.

FIG. 4 is a workflow showing an example data validation procedure 400 for an equipment in the industrial steam power and utility system. The data validation procedure 400 is a generic procedure that is applicable to any equipment that is or can be used in the system 100. The procedure 400 includes multiple operations, each of which can be implemented at least partially by the computer system 104. To do so, computer-executable code can be stored in the computer-readable medium 106b and executed by the data processing apparatus 106a. When implementing the operations, the computer system 104 receives operational physical parameter values from the equipment, and compares the received values with threshold values associated with the equipment. In some implementations, the computer system 104 can process the received values to determine mass balance and energy balance parameters, and compare the determined parameters against threshold parameters.

In addition, the procedure 400 can be implemented in multiple levels arranged in a hierarchy. The example procedure 400 includes three levels—a first level 402, a second level 404 and a third level 406. Some procedures can have more levels while others can have fewer levels. The first level 402 can represent a root level while the last level (e.g., the third level 406) can represent a leaf level without or with intermediate levels, e.g., the second level 404. In operation, the computer system 104 can implement the root level first, and implement subsequent levels down the hierarchy until the leaf level. For each level (except the leaf level), the computer system 104 can determine outputs and use the determined outputs as inputs for the next lower level in the hierarchy.

For example, the computer system 104 can implement step 410 in the first level 402 to extract status data for each equipment. The status data is received from sensors mounted to the equipment. For example, the status data is a DCS tag that provides an ON/OFF status of the equipment. In the context of this disclosure a "Producer" is a steam generating equipment such as a boiler, a cogeneration system or a process heater with convection section that produces steam connected to a steam header. In the context of this disclosure a "User" is a steam consuming equipment such as a heat exchanger or a re-boiler.

At 412, the computer system 104 verifies if users/producers is running. If the computer system 104 determines that users/producers is not running (decision branch "NO"), then the computer system 104 reports stream flow as zero, and the validation procedure ends. If the computer system 104 determines that users/producers is running (decision branch "YES"), then, at 416, the computer system extracts steam flow value. The steam flow values and all other values are extracted from a data historian system called Process Interface (PI) system, which will collect all information in real time from DCS.

At this point, the implementation of the first level 402 has been completed. The computer system 104 passes the extracted steam flow value as an input to the second level 404.

The computer system 104 can implement step 418 in the second level to check if the received steam flow value is within a threshold range (i.e., maximum and minimum limitations). If the computer system 104 determines that the value is not within the threshold range (decision branch "NO"), then the computer system 104 implements a user correlation to quantify steam flow versus as a function of process area feed rate as applicable. The correlation equation is an alternative way to provide a more accurate steam consumption value for a steam flow rate that has a faulty reading, e.g., because the DCS tag is faulty or the sensor attached to the equipment is faulty or both). The correlations are developed based on historical trends for key parameters that have direct impact on the steam consumption. The correlations were developed outside the system and revised from time to time to have more accurate representation of the equipment and its performance.

If the computer system 104 determines that the value is within the threshold range (decision branch "YES"), then the computer system 104 uses the extracted value from PI. The procedure mentions three categories—Class A, Class B and Class C. Class A, is a category class to differentiate accurate measurements with others. The value in Class A, is a trusted value and will be subject to minimum adjustment to close the energy and material balance for a steam header.

Returning to the decision branch "NO", after implementing the user correlation at step 420, the computer system 104 checks if the value is within a threshold range (i.e., maximum and minimum limitations). If the computer system 104 determines that the value is not within the threshold range (decision branch "NO"), then, at step 430, the computer system 104 uses steam flow design value or a user defined default value. Class C, is a category class to differentiate accurate measurements with others. The value in Class C, is a given value (i.e. default, suggested by an experience user for a common average value), where, design value is the value mentioned in the design document for this specific user. Both are not trusted values and will be subject to a major adjustment to close the energy and material balance for a steam header compared to class A.

If, at step 420, the computer system 104 determines that the value is within the threshold range (decision branch "YES"), then the computer system 104 uses the correlated steam flow value. Class B, is a category class to differentiate accurate measurements with others. The value in Class B, is relatively more accurate value that Class C. The value will be subject to a minor adjustment to close the energy and material balance for a steam header. The optimization technique will adjust the boundary limits for class A,B and C as required in an consistent way to ensure energy and material balances are closed at all time.

In this manner, if the computer system 104 determines that an operational physical parameter value received from a sensor attached to an equipment in the system 100 is accurate, then the computer system 104 uses that value in subsequent mass balance and energy balance determinations. If not, then the computer system 104 implements correlation operations to determine a closest approximation of what the sensor value would have been and uses that correlated value in the mass balance and energy balance determinations. Moving to step 428, the computer system 104 reflects the steam values in the steam table, i.e., stores the values in a database part of the steam balance together with a specific timestamp identifying when the value was determined.

The computer system 104 outputs the steam value with the classification (class A— trusted value that does not require an adjustment; class B— good value that requires minimum adjustment; class C— default value that requires some adjustment).

The computer system 104 can implement step 432 in the third level 406 to report the steam value received as the output of the second level 404. In some implementations, the computer system 104 can associate a weight to the received value based on the class associated with the value. Because a class A value is trustworthy, the weight can be 1. Because a class B value is comparatively less trustworthy, the weight can be less than 1. Because the trustworthiness of the class B value is between that of a class A value and a class C value, its weight can be between the weight of a class A value and the weight of a class C value. The computer system 104 can output the steam value, its classification and, optionally, its weight as an output of the validation procedure 400. As mentioned earlier, he optimization technique will adjust the boundary limits for class A,B and C as required in an consistent way to ensure energy and material balances are closed at all time.

FIGS. 5-12 are workflows showing example data validation procedures for a heat exchanger, a cogeneration system, a boiler, a process heater, mechanical drivers and power generators, a motor-pump/compressor, and a gas turbine, respectively. Each data validation procedure is substantially similar to the data validation procedure 400. Whereas the data validation procedure 400 is generic to any equipment in the system 100, each of the data validation procedures shown in FIGS. 5-12 are implemented with reference to a specific equipment.

Figure 5:
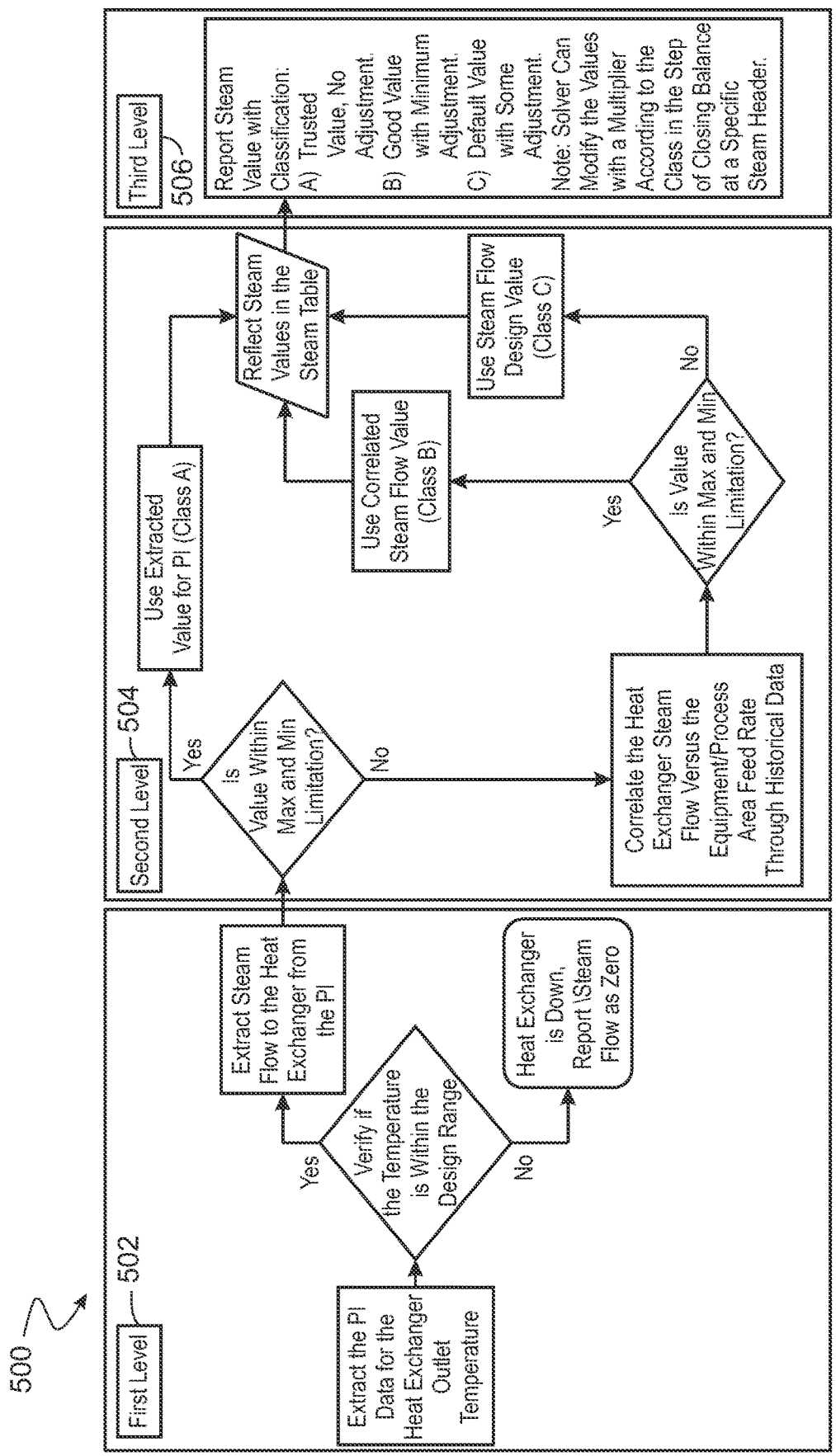
FIG. 5 is a workflow showing an example heat exchanger data validation procedure.

For example, FIG. 5 is a workflow showing an example data validation procedure 500 for a heat exchanger. The heat exchanger steam users include all the facility reboilers and process heaters connected to different steam headers. The heat exchanger steam consumption data validation procedure 500 (HX-DVR) includes three levels of validation and reconciliation. On the first level 502, the exchangers are checked whether they are online or offline by the process stream outlet temperature. The temperature limit where the exchanger is considered to be is based on design data or historical data or a combination of both. The steam flow reading from PI is not accounted if the temperature is below the set limit and that exchanger steam flow is reflected as zero. At the second level 504, the extracted steam flow reading is refined through minimum and maximum limitations. At the level 504, the limitations are set based on the exchangers steam flow rate design data. If the extracted data from PI is within the set limitations, then the PI value reading is reflected in the steam table with classification A. If the PI reading is out of the minimum and maximum limitations, then a correlated steam flow reading based on historical data is used. If the correlated value is within the minimum and maximum limitations, then that value is reflected in the steam table with classification B. At the end of the validation procedure, if the correlated value is not within the minimum and maximum limitations, then the design steam flow reading is used with a classification C. The third level 506 of validation is to ensure that the reported values in the steam table lead to a close balance and adjusting the steam flow values based on their classification as—class A— trusted value that does not require an adjustment; class B— good value that requires minimum adjustment; class C— default value that requires some adjustment. For any PI reading for a heat exchange specific operational parameter value received the sensors (implemented, for example, as a distributed control system), there is always a reliable value representing the specific operational physical parameter as an output from the data validation procedure 500 regardless of the issues associated with the subject PI value, thereby ensuring a reliable system with accurate outcomes as much as possible.

Figure 6:
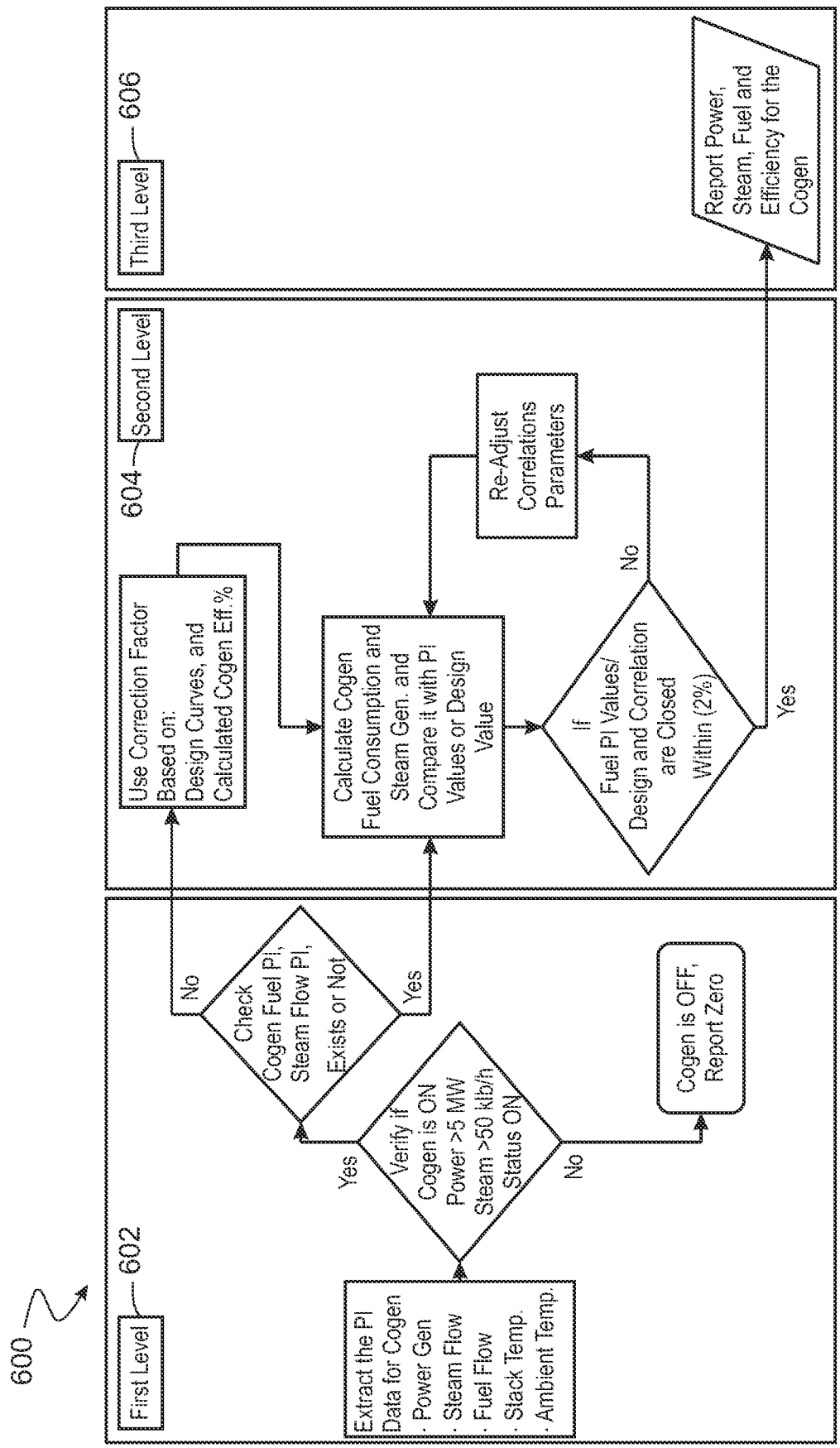
FIG. 6 is a workflow showing an example cogeneration data validation procedure.

FIG. 6 is a workflow showing an example cogeneration data validation procedure 600 for a cogeneration system. The cogeneration data validation procedure 600 (CGN-DVR) forms a part of the industrial plant's online CHP model, i.e., a Combined Heat and Power system model, which is an optimization model developed to represent the steam and power systems for an industrial facility.

The validation procedure 600 includes three levels of data validation and reconciliation. Key measurements from a DCS pertaining to a cogeneration system are used as inputs to determine the current operational condition of cogeneration equipment such as a gas turbine and a heat recovery steam generator (HRSG). In the first level 602, the gas turbine status is checked to see if it is online or offline. The electrical power generation and steam flow from the HRSG can be used to check if the cogeneration system is operational. The power and steam limits where the cogeneration system is considered to be online is typically based on design data or historical data or a combination of both. The steam flow reading from PI, on the other hand, is not accounted, if the temperature is below the set limit and that the HRSG steam flow is reflected as zero. At the second level 602, interrelated variables are reconciled to ensure that measured and reconciled parameter are within 2% error. The extracted power, steam flow, fuel flow and stack temperature values are bound within reasonable lower and upper limits. If the extracted data from PI is within set limits, then the PI value reading is reflected in the model. If the PI reading is out of the minimum and maximum limitations, then correlated values based on historical data are used. If the correlated value is within the min and max limitations, then that value is reflected in the model. At the end of the validation procedure 600, if the correlated value is not within the minimum and maximum limitations, then the design data is used. The third (and final) level of validation 606 ensures that the reported values in the model leads to a close balance.

Figure 7:
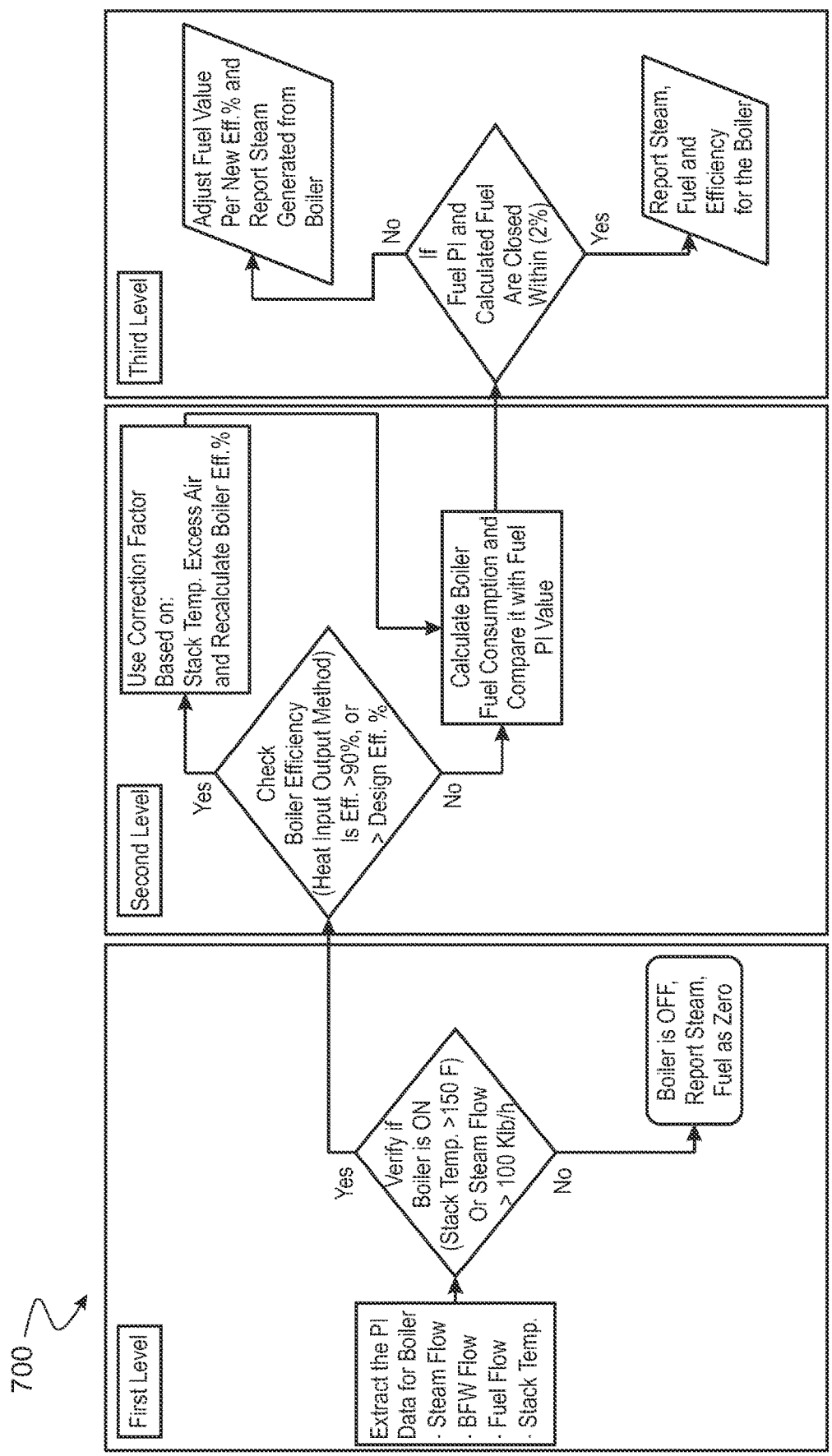
FIG. 7 is a workflow showing an example boiler data validation procedure.

FIG. 7 is a workflow showing an example boiler data validation procedure 700. For boiler data validation and reconciliation, the PI raw data for boiler steam, BFW, fuel flow rates and stack temperature are received. A validation step is implemented to identify if the boiler is running or not. This step is based on if the flue gas (stack) temperature is less than 150° F. If yes, then the boiler is off and zero is reported for the flow rate. If the boiler is running, then another cross check is performed based on steam, fuel and BFW flow rates and boiler efficiency. If the determined boiler efficiency based on heat input/output method is greater than 90%, then the correlation equation (below) is used to calculate the boiler efficiency, and the fuel value is adjusted accordingly. If the efficiency is within range, then the fuel consumption is validated based on the expected and actual values. If the error is within 2%, then the fuel value is used as is or adjusted to be within 2% error. The inputs for the boiler's efficiency correlation equation are the stack temperature (Stack Temp, ° F.) and excess oxygen (Excess 02, %). Both are collected from PI data. The correlation parameter (AO2, BO2, AT, BT) are generated for each specific boiler and updated periodically, for example, at a frequency of once per year or once per a different time duration.

$$\mathit{Eff}=(AO2*\text{Excess }O2+BO2)*(1-AT*\text{Stack Temp})+BT*\text{Stack Temp}$$

Figure 8:
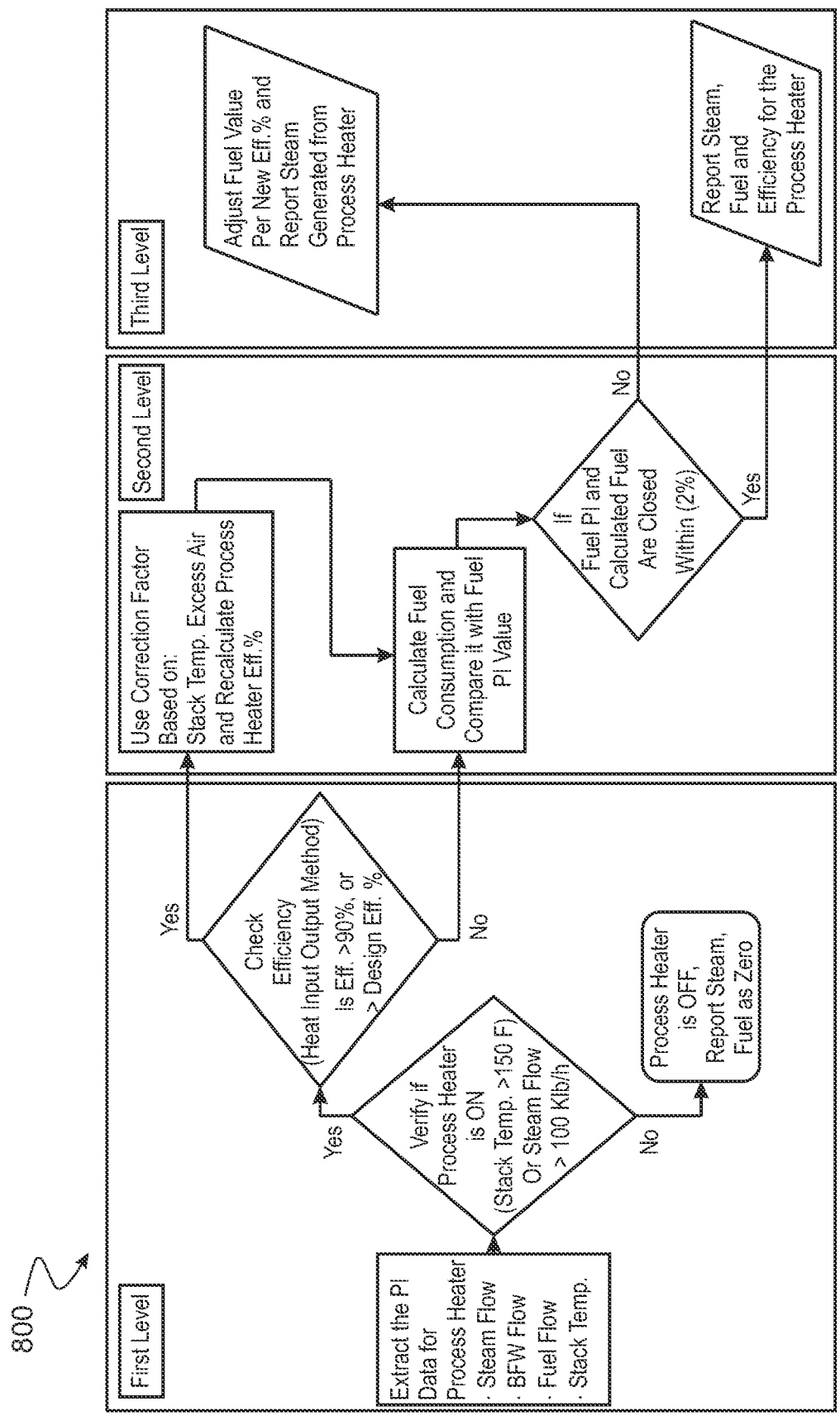
FIG. 8 is a workflow showing an example process heater data validation procedure.

FIG. 8 is a workflow showing an example process heater data validation procedure 800. The validation procedure 800 (PH-DVR) is part of the industrial plant 100 online CHP model. A process heater can be in the form of a furnace or waste heat boiler. For this unit, PI data is extracted for generated steam, BFW, fuel flow rates and stack temperature. Then, a validation step is implemented to identify if the boiler is running or not. This step is based on if the flue gas (stack) temperature is less than 150° F. If yes, then the process heater is off and zero is reported for the flow rate. If the process heater is running, then another cross check is performed based on steam, fuel and BFW flow rates and boiler efficiency. If the determined boiler efficiency based on heat input/output method is greater than 90%, then the correlation equation (below) is used to calculate the boiler efficiency, and the fuel value is adjusted accordingly. If the efficiency is within range, then the fuel consumption is validated based on the expected and actual values. If the error is within 2%, then the fuel value is used as is or adjusted to be within 2% error. The inputs for the boiler's efficiency correlation equation are the stack temperature (Stack Temp, °F.) and excess oxygen (Excess 02, %). Both are collected from PI data. The correlation parameter (AO2, BO2, AT, BT) are generated for each specific boiler and updated periodically, for example, at a frequency of once per year or once per a different time duration.

$$Eff=(AO2*\text{Excess }O2+BO2)*(1-AT*\text{Stack Temp})+BT*\text{Stack Temp}$$

Figure 9:
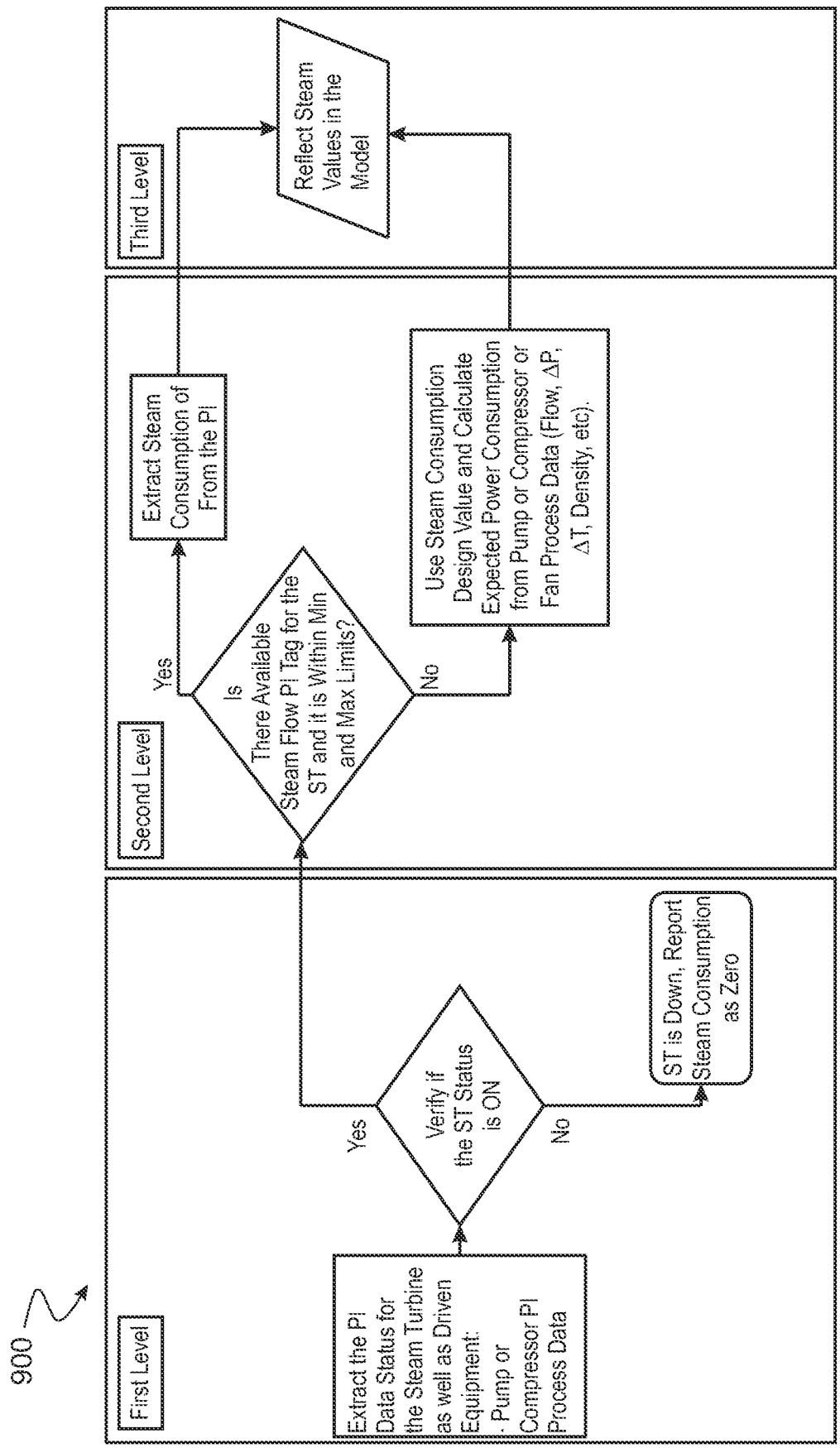
FIG. 9 is a workflow showing data validation procedures for mechanical drivers and power generators.

FIG. 9 is a workflow showing data validation procedures 900 for mechanical drivers and power generators. The data validation procedure 900 (ST-DVR) covers mechanical driven equipment such as compressors, pumps, air blowers and the like. Such turbines typically operate at speeds relative to the driven process equipment. For the mechanical drivers and power generators, PI data is retrieved for the various stages of the steam turbine (i.e., admission, extraction, induction and the like), RPM and the driven process stream flow. Then, a validation step is performed to identify if the unit is running or not. This is based on if the RPM is less than the design range of operation. If the mechanical drivers and power generators are running, then another cross check is performed based on the steam flow rate. The steam turbine efficiency is based on actual operation versus isentropic operation extracted from steam temperatures from the turbine. If there is a steam flow PI-tag for the steam passing to the steam turbine and the value is within minimum and maximum ranges, then the value will be used on the model. If there is no steam reading or the reading is outside the minimum and maximum ranges, then a correlation is used to quantify the expected steam consumption based on process parameters related to the steam turbines or a design value is used. Then, this value is subject to variations by the data reconciliation layer within acceptable ranges.

Figure 10:
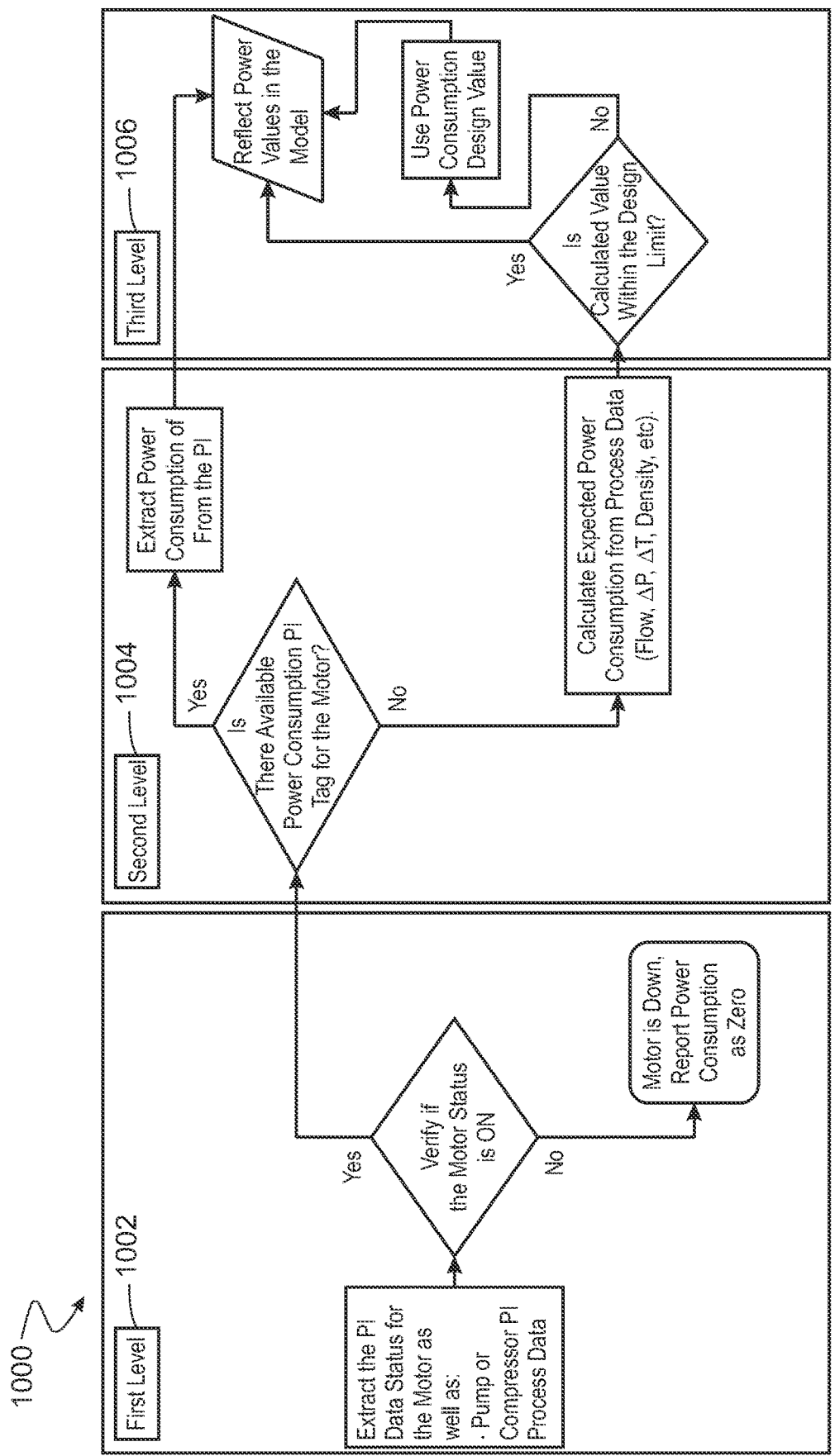
FIG. 10 is a workflow showing motor-pump/compressor data validation procedure.

FIG. 10 is a workflow showing motor-pump/compressor data validation procedure 1000. The motors include all the facility motors driving all pumps and compressors. The data validation procedure 1000 (MT-DVR) includes three levels of validation and reconciliation. In the first level 1002, the status of the motor is extracted from the PI to check if the motor is ON or OFF. If the motor is OFF, then the power consumption of the motor is considered to be zero. If the motor is ON, then the second level 1004 of validation is implemented. In the second level 1004, a check is performed if there is available power consumption PI tag. The power consumption data is extracted from the PI system if there is an available motor power consumption PI tag. If the motor power consumption PI tag is unavailable, the motor power consumption is determined based on other process parameters for pumps (e.g., pressure differential, flow, temperature differential, specific density and the like). In the last validation level 1006, if the determined value is not within the design limit due to fault reading in one other used process parameters, then the motor power consumption design rate is used as a user default value.

Figure 11:
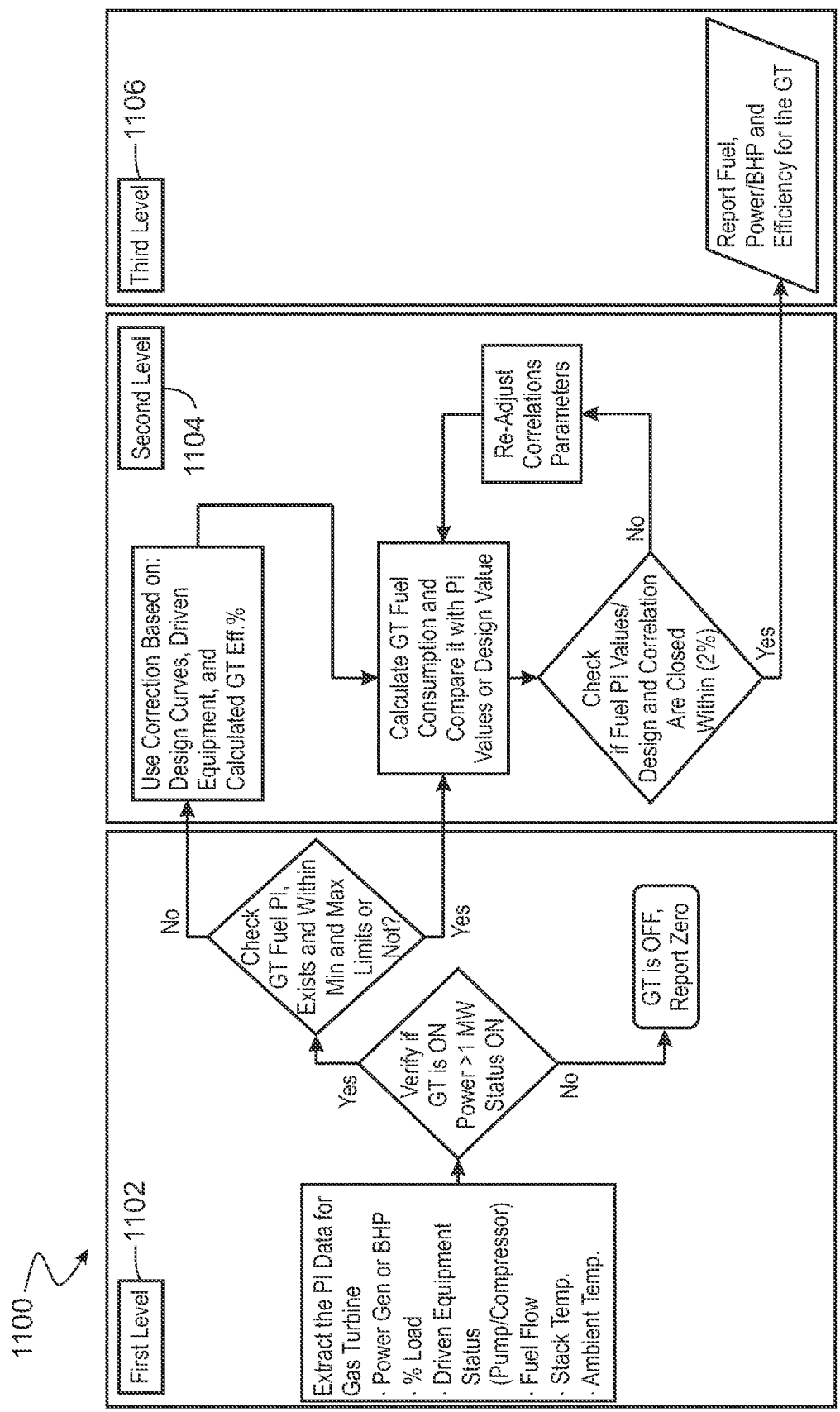
FIG. 11 is a workflow showing gas turbine data validation procedure.

FIG. 11 is a workflow showing gas turbine data validation procedure 1100 (GT-DVR). The procedure 1100 is implemented in three levels of data validation and reconciliation. Key measurements from a DCS pertaining to a simple cycle gas turbine unit are used as inputs to determine the current operational condition of the gas turbine. In the first level 1102, the gas turbine status is checked to see if it is online or offline. The electrical power generation or mechanical driven unit (e.g., pump or compressor) is used to check if the unit is operational. The power limits where the gas turbine unit is considered to be online is typically based on design data or historical data or a combination of both. At the second level 1104, interrelated variables are reconciled together to make sure that measured and reconciled parameters are within 2% error. The extracted power, fuel flow and stack temperature values are bound within reasonable lower and upper limits. If the extracted data from PI is within set limits, then the PI value reading is reflected in the model. If the PI reading is out of the minimum and maximum limitations, then the PI value reading based on design data or historical data or a combination of both are used. If the correlated value is within the minimum and maximum limitations, then it is reflected in the model. At the end of the validation procedure, if the correlated value is not within the minimum and maximum limitations, then the design value is used. The last level of validation (level 1106) ensures that the reported values in the model leads to a close balance.

Gas Turbine Efficiency (%)=$BHP$ output of driven equipment or $MW$ output/Fuel consumption by gas turbine unit Each of the data validation procedures described earlier is implemented by the computer system 104 as computer-executable instructions. Subsequently, the computer system 104 implements an overall steam system data reconciliation to ensure closing balance in the most accurate way possible. The computer system 104 implements the steam system data validation and reconciliation for closing balance subject to the following points:

1. PI data related to the following variables will be maintained as-is for establishing the base-case:
   a. Boilers steam production
   b. Cogen system steam and power production
   c. Letdown steam flow
   d. Excess steam flow
2. Adjustment will be made to steam process users that has PI issues or high errors, and the adjustment will follow the procedure identified for each equipment flow-chart.
3. The adjustment factor for each steam user is a decision variable for an optimization layer that aims to close the individual header balance as well as the overall system steam balance.

Problem formulation for error minimization and closing balance on each other header and overall steam system is implemented by the computer system 104 by executing the following equation: Objective function=Min Headers Errors $\Sigma_1^n$Header_n (SteamIn−SteamOut), subject to the following constraints:

Keeping steam from boilers unchanged,
Cogen steam and power production unchanged,
Letdown station flows unchanged,
Equipment steam consumption will be adjusted between minimum and maximum limits, according to specific flow chart for each equipment/user.

In some implementations, the computer system 104 implements an optimization layer that provides advisory recommendations to adjust loading of major equipment in the operating facilities which helps to improve steam and power system efficiency and reduce carbon dioxide emissions. The computer system 104 implements the optimization by executing an objective function subject to variables and constraints. The objective function aims to minimize facility operating cost, which includes fuel cost, power import and export cost and make-up water and water treatment costs. The variables in the optimization include steam and power loading of major equipment in the steam systems, e.g., all the equipment for which validation procedures were described above. The optimization is subject to several constraints representing the operational and equipment limitations. Examples include:

Meeting all steam and power demand of the facility,
Steam, power, fuel and water requirement subject to contractual agreement with a 3rd party or a joint vendor,
Environmental regulations on carbon dioxide emissions or similar requirement,
Energy and material balance of the steam and power network within the facility,
Equipment maximum and minimum output limitations,
Non-negative flows in the steam distribution network,
Steam and power reserve required by the facility,
Minimum number of running equipment to satisfy reliability requirement as applicable.

Figure 12:
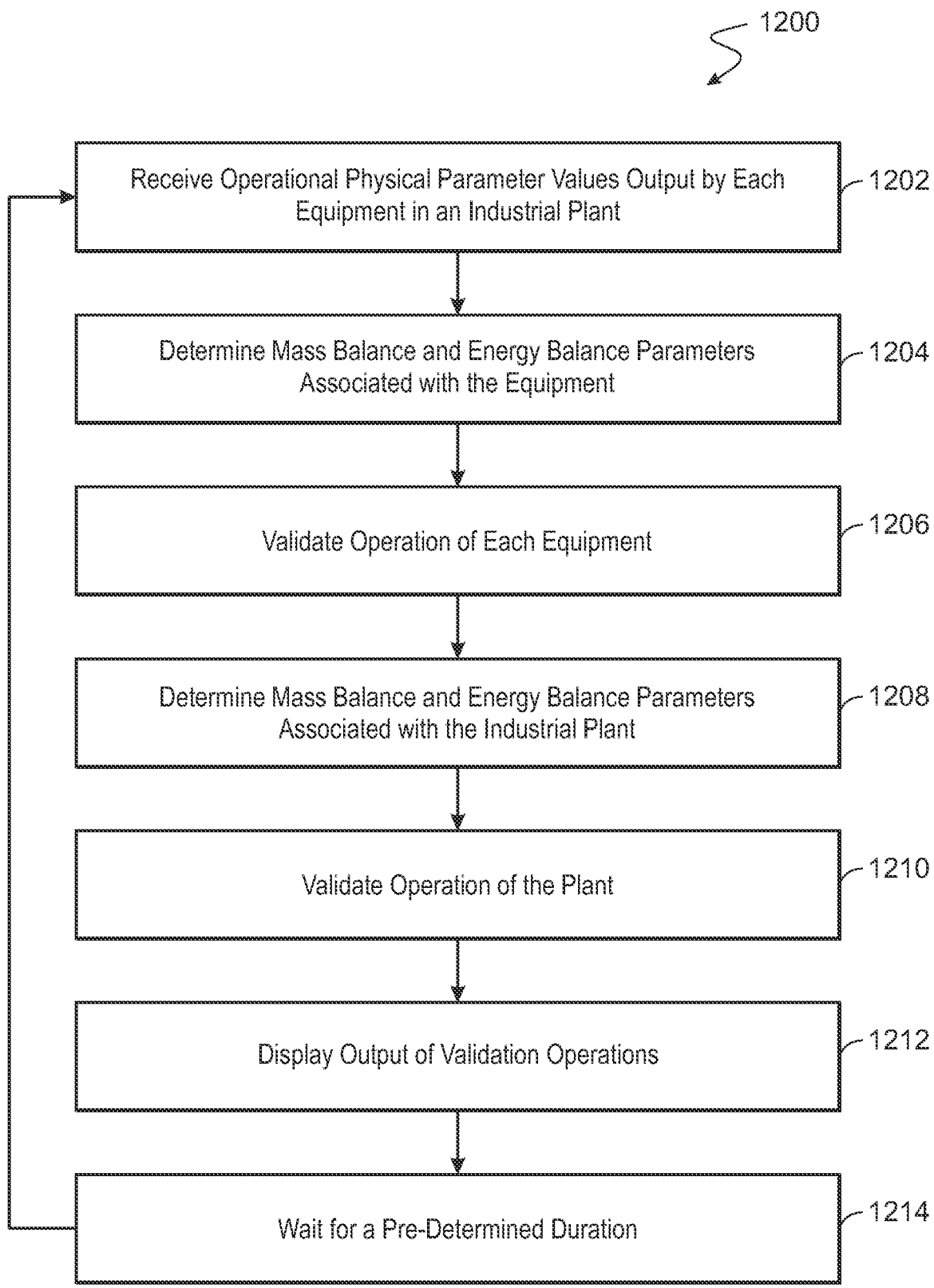
FIG. 12 is a flowchart of an example of a method of data validation and optimization of the industrial steam power and utility system.

FIG. 12 is a flowchart of an example of a method 1200 of data validation and optimization of the industrial steam power and utility system. The method 1200 is implemented by a computer system (e.g., computer system 104) in an industrial plant (e.g., industrial plant 100) implementing steam and power systems. The industrial plant includes multiple equipment including a cogeneration system and a steam turbine. At 1202, for each equipment, the computer system receives (during operation of each equipment), measured operational physical parameter values output by the equipment during the operation of the equipment. At 1204, the computer system 104 determines mass balance and energy balance parameters associated with the equipment using the received operational physical parameter values. At 1206, the computer system 104 validates an operation of the equipment using the determined mass balance and energy balance parameters. After validating mass balance and energy balance parameters for the multiple equipment, at 1208, the computer system 104 determines mass balance and energy balance parameters associated with the industrial plant using the mass balance and energy balance parameters for each equipment. At 1210, the computer system 104 validates an operation of the industrial plant using the determined mass balance and energy balance parameters associated with the industrial plant. At 1212, the computer system 104 displays output of validation operations. At 1214, the computer system waits for a pre-determined duration (e.g., one hour, or less than or more than one hour), and repeats steps 1202-1212. The validation solution implemented by the computer system 104 eliminates faulty readings and ensures an accurate representation of the operating facilities' steam and power utility systems.

Figure 13:
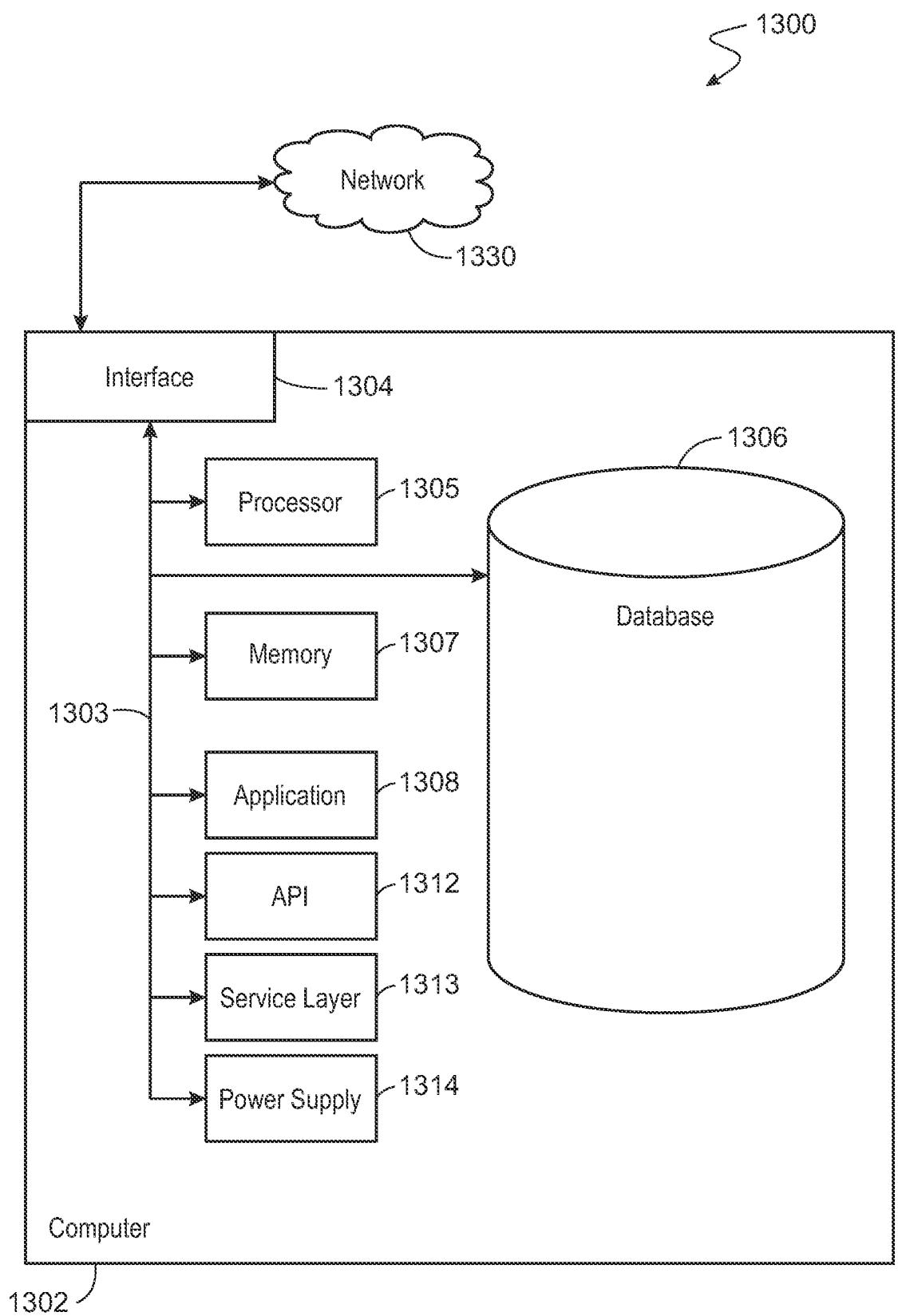
FIG. 13 is a block diagram of an example computer system used to provide computational functionalities associated with described algorithms, methods, functions, processes, flows, and procedures described in the present disclosure.

FIG. 13 is a block diagram of an example computer system 1300 (e.g., computer system 104) used to provide computational functionalities associated with described algorithms, methods, functions, processes, flows, and procedures described in the present disclosure, according to some implementations of the present disclosure. The illustrated computer 1302 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1302 can include input devices such as keypads, keyboards, and touch screens that can accept user information. Also, the computer 1302 can include output devices that can convey information associated with the operation of the computer 1302. The information can include digital data, visual data, audio information, or a combination of information. The information can be presented in a graphical user interface (UI) (or GUI).

The computer 1302 can serve in a role as a client, a network component, a server, a database, a persistency, or components of a computer system for performing the subject matter described in the present disclosure. The illustrated computer 1302 is communicably coupled with a network 1330. In some implementations, one or more components of the computer 1302 can be configured to operate within different environments, including cloud-computing-based environments, local environments, global environments, and combinations of environments.

At a top level, the computer 1302 is an electronic computing device operable to receive, transmit, process, store, and manage data and information associated with the described subject matter. According to some implementations, the computer 1302 can also include, or be communicably coupled with, an application server, an email server, a web server, a caching server, a streaming data server, or a combination of servers.

The computer 1302 can receive requests over network 1330 from a client application (for example, executing on another computer 1302). The computer 1302 can respond to the received requests by processing the received requests using software applications. Requests can also be sent to the computer 1302 from internal users (for example, from a command console), external (or third) parties, automated applications, entities, individuals, systems, and computers.

Each of the components of the computer 1302 can communicate using a system bus 1303. In some implementations, any or all of the components of the computer 1302, including hardware or software components, can interface with each other or the interface 1304 (or a combination of both) over the system bus 1303. Interfaces can use an application programming interface (API) 1312, a service layer 1313, or a combination of the API 1312 and service layer 1313. The API 1312 can include specifications for routines, data structures, and object classes. The API 1312 can be either computer-language independent or dependent. The API 1312 can refer to a complete interface, a single function, or a set of APIs.

The service layer 1313 can provide software services to the computer 1302 and other components (whether illustrated or not) that are communicably coupled to the computer 1302. The functionality of the computer 1302 can be accessible for all service consumers using this service layer. Software services, such as those provided by the service layer 1313, can provide reusable, defined functionalities through a defined interface. For example, the interface can be software written in JAVA, C++, or a language providing data in extensible markup language (XML) format. While illustrated as an integrated component of the computer 1302, in alternative implementations, the API 1312 or the service layer 1313 can be stand-alone components in relation to other components of the computer 1302 and other components communicably coupled to the computer 1302. Moreover, any or all parts of the API 1312 or the service layer 1313 can be implemented as child or sub-modules of another software module, enterprise application, or hardware module without departing from the scope of the present disclosure.

The computer 1302 includes an interface 1304. Although illustrated as a single interface 1304 in FIG. 13, two or more interfaces 1304 can be used according to particular needs, desires, or particular implementations of the computer 1302 and the described functionality. The interface 1304 can be used by the computer 1302 for communicating with other systems that are connected to the network 1330 (whether illustrated or not) in a distributed environment. Generally, the interface 1304 can include, or be implemented using, logic encoded in software or hardware (or a combination of software and hardware) operable to communicate with the network 1330. More specifically, the interface 1304 can include software supporting one or more communication protocols associated with communications. As such, the network 1330 or the interface's hardware can be operable to communicate physical signals within and outside of the illustrated computer 1302.

The computer 1302 includes a processor 1305. Although illustrated as a single processor 1305 in FIG. 13, two or more processors 1305 can be used according to particular needs, desires, or particular implementations of the computer 1302 and the described functionality. Generally, the processor 1305 can execute instructions and can manipulate data to perform the operations of the computer 1302, including operations using algorithms, methods, functions, processes, flows, and procedures as described in the present disclosure.

The computer 1302 also includes a database 1306 that can hold data for the computer 1302 and other components connected to the network 1330 (whether illustrated or not). For example, database 1306 can be an in-memory, conventional, or a database storing data consistent with the present disclosure. In some implementations, database 1306 can be a combination of two or more different database types (for example, hybrid in-memory and conventional databases) according to particular needs, desires, or particular implementations of the computer 1302 and the described functionality. Although illustrated as a single database 1306 in FIG. 13, two or more databases (of the same, different, or combination of types) can be used according to particular needs, desires, or particular implementations of the computer 1302 and the described functionality. While database 1306 is illustrated as an internal component of the computer 1302, in alternative implementations, database 1306 can be external to the computer 1302.

The computer 1302 also includes a memory 13013 that can hold data for the computer 1302 or a combination of components connected to the network 1330 (whether illustrated or not). Memory 13013 can store any data consistent with the present disclosure. In some implementations, memory 13013 can be a combination of two or more different types of memory (for example, a combination of semiconductor and magnetic storage) according to particular needs, desires, or particular implementations of the computer 1302 and the described functionality. Although illustrated as a single memory 13013 in FIG. 13, two or more memories 13013 (of the same, different, or combination of types) can be used according to particular needs, desires, or particular implementations of the computer 1302 and the described functionality. While memory 13013 is illustrated as an internal component of the computer 1302, in alternative implementations, memory 13013 can be external to the computer 1302.

The application 1308 can be an algorithmic software engine providing functionality according to particular needs, desires, or particular implementations of the computer 1302 and the described functionality. For example, application 1308 can serve as one or more components, modules, or applications. Further, although illustrated as a single application 1308, the application 1308 can be implemented as multiple applications 1308 on the computer 1302. In addition, although illustrated as internal to the computer 1302, in alternative implementations, the application 1308 can be external to the computer 1302.

The computer 1302 can also include a power supply 1314. The power supply 1314 can include a rechargeable or non-rechargeable battery that can be configured to be either user- or non-user-replaceable. In some implementations, the power supply 1314 can include power-conversion and management circuits, including recharging, standby, and power management functionalities. In some implementations, the power supply 1314 can include a power plug to allow the computer 1302 to be plugged into a wall socket or a power source to, for example, power the computer 1302 or recharge a rechargeable battery.

There can be any number of computers 1302 associated with, or external to, a computer system containing computer 1302, with each computer 1302 communicating over network 1330. Further, the terms "client," "user," and other appropriate terminology can be used interchangeably, as appropriate, without departing from the scope of the present disclosure. Moreover, the present disclosure contemplates that many users can use one computer 1302 and one user can use multiple computers 1302.

For the purposes of this disclosure, the terms "real-time," "real time," "realtime," "real (fast) time (RFT)," "near(ly) real-time (NRT)," "quasi real-time," or similar terms (as understood by one of ordinary skill in the art) mean that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec, less than 5 secs, etc. In another example, the time difference for a response to transmit a measured value (e.g., to be displayed or to be processed) following measurement of the value may be less than 1 ms, less than 1 sec, less than 5 secs, etc. While the requested data need not be displayed (or initiated for display) or the operation be performed instantaneously, it is displayed (or initiated for display) or the operation is performed without any intentional delay, taking into account processing limitations of a described computing system and time required to, for example, gather, accurately measure, analyze, process, store, or transmit (or a combination of these or other functions) the data.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
in an industrial plant implementing steam and power systems, the industrial plant comprising a plurality of equipment comprising a cogeneration system and a steam turbine:
for each equipment of the plurality of equipment:
receiving, by a computer system and during operation of each equipment, measured operational physical parameter values output by the equipment during the operation of the equipment,
determining, by the computer system, and using the received operational physical parameter values, mass balance and energy balance parameters associated with the equipment,
validating, by the computer system, an operation of the equipment using the determined mass balance and energy balance parameters to classify an accuracy of measurement of the operational physical parameter values into one of a plurality of categories,
determining, based on the one of the plurality of categories, a level of adjustment of the equipment to close one or more balances,
adjusting, according to the level of adjustment, a flow of steam to one or more equipment of the plurality of equipment and
after validating mass balance and energy balance parameters for the plurality of equipment:
determining, by the computer system and using determined mass balance and energy balance parameters for each equipment of the plurality of equipment, mass balance and energy balance parameters associated with the industrial plant, and
validating, by the computer system, an operation of the industrial plant using the determined mass balance and energy balance parameters associated with the industrial plant.

2. The method of claim 1, wherein, for each equipment of the plurality of equipment, validating the operation of the equipment using the determined mass balance and energy balance parameters is implemented as a level in a multi-level validation process, wherein the multi-level validation process further comprises verifying that each measured operational physical parameter value output by the equipment during the operation of the equipment is within a threshold physical parameter value range associated with the equipment.

3. The method of claim 2, wherein the multi-level validation process further comprises comparing each measured operational physical parameter value output by the equipment during the operation of the equipment with stored historical data comprising historically measured operational physical parameter values output during past operations of the equipment.

4. The method of claim 3, wherein the multi-level validation process further comprises, based on a result of verifying that each measured operational physical parameter value output by the equipment during the operation of the equipment is within the threshold physical parameter value range associated with the equipment, and based on comparing each measured operational physical parameter value output by the equipment during the operation of the equipment with stored historical data comprising historically measured operational physical parameter values output during past operations of the equipment, classifying each measured operational physical parameter value as a value that accurately represents an operational state of the equipment or as a value that comparatively less accurately represents the operational state of the equipment.

5. The method of claim 3, wherein verifying that each measured operational physical parameter value output by the equipment during the operation of the equipment is within a threshold physical parameter value range associated with the equipment is a first level of the multi-level validation process, and classifying each measured operational physical parameter value is a last level of the multi-level validation process.

6. The method of claim 1, wherein validating the operation of the industrial plant using the determined mass balance and energy balance parameters associated with the industrial plant comprises:
determining, using the mass balance and energy balance parameters associated with the industrial plant, that the industrial plant is operating outside threshold parameters associated with the industrial plant;
in response to determining that the industrial plant is operating outside the threshold parameters, determining a level to which a physical process input to one or more of the equipment of the plurality of equipment is to be modified to cause the industrial plant to operate within the threshold parameters; and
transmitting instructions to cause an operation of the physical process to be modified to the determined level.

7. The method of claim 6, wherein the physical process is the flow of steam to one or more of the equipment of the plurality of equipment, wherein the level to which the physical process is to be modified comprises the level of adjustment.

8. The method of claim 1, further comprising:
for each equipment of the plurality of equipment, displaying results of validating the operation of the equipment using the determined mass balance and energy balance parameters in a user interface displayed on a computer monitor operatively connected to the computer system; and
displaying results of validating the operation of the industrial plant using the determined mass balance and energy balance parameters associated with the industrial plant on the computer monitor.

9. The method of claim 8, wherein validating the operation of each equipment of the plurality of equipment and validating the operation of the industrial plant is implemented at a frequency, wherein the displayed results of validating the operation of the equipment and the displayed results of validating the operation of the industrial plant are updated on the computer monitor at the frequency.

10. A non-transitory computer-readable medium storing instructions executable by one or more computers to perform operations comprising:
   in an industrial plant implementing steam and power systems, the industrial plant comprising a plurality of equipment comprising a cogeneration system and a steam turbine:
      for each equipment of the plurality of equipment:
         receiving, by a computer system and during operation of each equipment, measured operational physical parameter values output by the equipment during the operation of the equipment,
         determining, by the computer system, and using the received operational physical parameter values, mass balance and energy balance parameters associated with the equipment,
         validating, by the computer system, an operation of the equipment using the determined mass balance and energy balance parameters to classify an accuracy of measurement of the operational physical parameter values into one of a plurality of categories,
         determining, based on the one of the plurality of categories, a level of adjustment of the equipment to close one or more balances,
         adjusting, according to the level of adjustment, a flow of steam to one or more equipment of the plurality of equipment; and
      after validating mass balance and energy balance parameters for the plurality of equipment:
         determining, by the computer system and using determined mass balance and energy balance parameters for each equipment of the plurality of equipment, mass balance and energy balance parameters associated with the industrial plant, and
         validating, by the computer system, an operation of the industrial plant using the determined mass balance and energy balance parameters associated with the industrial plant.

11. The medium of claim 10, wherein, for each equipment of the plurality of equipment, validating the operation of the equipment using the determined mass balance and energy balance parameters is implemented as a level in a multi-level validation process, wherein the multi-level validation process further comprises verifying that each measured operational physical parameter value output by the equipment during the operation of the equipment is within a threshold physical parameter value range associated with the equipment.

12. The medium of claim 11, wherein the multi-level validation process further comprises comparing each measured operational physical parameter value output by the equipment during the operation of the equipment with stored historical data comprising historically measured operational physical parameter values output during past operations of the equipment.

13. The medium of claim 12, wherein the multi-level validation process further comprises, based on a result of verifying that each measured operational physical parameter value output by the equipment during the operation of the equipment is within the threshold physical parameter value range associated with the equipment, and based on comparing each measured operational physical parameter value output by the equipment during the operation of the equipment with stored historical data comprising historically measured operational physical parameter values output during past operations of the equipment, classifying each measured operational physical parameter value as a value that accurately represents an operational state of the equipment or as a value that comparatively less accurately represents the operational state of the equipment.

14. The medium of claim 12, wherein verifying that each measured operational physical parameter value output by the equipment during the operation of the equipment is within a threshold physical parameter value range associated with the equipment is a first level of the multi-level validation process, and classifying each measured operational physical parameter value is a last level of the multi-level validation process.

15. The medium of claim 10, wherein validating the operation of the industrial plant using the determined mass balance and energy balance parameters associated with the industrial plant comprises:
   determining, using the mass balance and energy balance parameters associated with the industrial plant, that the industrial plant is operating outside threshold parameters associated with the industrial plant;
   in response to determining that the industrial plant is operating outside the threshold parameters, determining a level to which a physical process input to one or more of the equipment of the plurality of equipment is to be modified to cause the industrial plant to operate within the threshold parameters; and
   transmitting instructions to cause an operation of the physical process to be modified to the determined level.

16. The medium of claim 15, wherein the physical process is the flow of steam to one or more of the equipment of the plurality of equipment, wherein the level to which the physical process is to be modified comprises the level of adjustment.

17. The medium of claim 10, the operations further comprising:
   for each equipment of the plurality of equipment, displaying results of validating the operation of the equipment using the determined mass balance and energy balance parameters in a user interface displayed on a computer monitor operatively connected to the computer system; and
   displaying results of validating the operation of the industrial plant using the determined mass balance and energy balance parameters associated with the industrial plant on the computer monitor.

18. The medium of claim 17, wherein validating the operation of each equipment of the plurality of equipment and validating the operation of the industrial plant is implemented at a frequency, wherein the displayed results of validating the operation of the equipment and the displayed results of validating the operation of the industrial plant are updated on the computer monitor at the frequency.

19. A system comprising:
   one or more computers; and
   a computer-readable medium storing instructions executable by one or more computers to perform operations comprising:
      in an industrial plant implementing steam and power systems, the industrial plant comprising a plurality of equipment comprising a cogeneration system and a steam turbine:
         for each equipment of the plurality of equipment:
            receiving, by a computer system and during operation of each equipment, measured operational physical parameter values output by the equipment during the operation of the equipment, determining, by the computer system, and using the received operational physical parameter values, mass balance and energy balance parameters associated with the equipment, validating, by the computer system, an operation of the equipment using the determined mass balance and energy balance parameters to classify an accuracy of measurement of the operational physical parameter values into one of a plurality of categories, determining, based on the one of the plurality of categories, a level of adjustment of the equipment to close one or more balances, adjusting, according to the level of adjustment, a flow of steam to one or more equipment of the plurality of equipment and after validating mass balance and energy balance parameters for the plurality of equipment:

determining, by the computer system and using determined mass balance and energy balance parameters for each equipment of the plurality of equipment, mass balance and energy balance parameters associated with the industrial plant, and validating, by the computer system, an operation of the industrial plant using the determined mass balance and energy balance parameters associated with the industrial plant.

20. The system of claim 19, wherein, for each equipment of the plurality of equipment, validating the operation of the equipment using the determined mass balance and energy balance parameters is implemented as a level in a multi-level validation process, wherein the multi-level validation process further comprises verifying that each measured operational physical parameter value output by the equipment during the operation of the equipment is within a threshold physical parameter value range associated with the equipment.

21. A method comprising:

in an industrial plant implementing steam and power systems, the industrial plant comprising a plurality of equipment comprising a cogeneration system and a steam turbine:

for each equipment of the plurality of equipment:

receiving, by a computer system and during operation of each equipment, measured operational physical parameter values output by the equipment during the operation of the equipment, determining, by the computer system, and using the received operational physical parameter values, mass balance and energy balance parameters associated with the equipment, and validating, by the computer system, an operation of the equipment using the determined mass balance and energy balance parameters; and after validating mass balance and energy balance parameters for the plurality of equipment:

determining, by the computer system and using determined mass balance and energy balance parameters for each equipment of the plurality of equipment, mass balance and energy balance parameters associated with the industrial plant, and validating, by the computer system, an operation of the industrial plant using the determined mass balance and energy balance parameters associated with the industrial plant, wherein, for each equipment of the plurality of equipment, validating the operation of the equipment using the determined mass balance and energy balance parameters is implemented as a level in a multi-level validation process, wherein the multi-level validation process further comprises verifying that each measured operational physical parameter value output by the equipment during the operation of the equipment is within a threshold physical parameter value range associated with the equipment, wherein the multi-level validation process further comprises comparing each measured operational physical parameter value output by the equipment during the operation of the equipment with stored historical data comprising historically measured operational physical parameter values output during past operations of the equipment, wherein the multi-level validation process further comprises, based on a result of verifying that each measured operational physical parameter value output by the equipment during the operation of the equipment is within the threshold physical parameter value range associated with the equipment, and based on comparing each measured operational physical parameter value output by the equipment during the operation of the equipment with stored historical data comprising historically measured operational physical parameter values output during past operations of the equipment, classifying each measured operational physical parameter value as a value that accurately represents an operational state of the equipment or as a value that comparatively less accurately represents the operational state of the equipment, wherein validating the operation of the industrial plant using the determined mass balance and energy balance parameters associated with the industrial plant comprises:

determining, using the mass balance and energy balance parameters associated with the industrial plant, that the industrial plant is operating outside threshold parameters associated with the industrial plant;

in response to determining that the industrial plant is operating outside the threshold parameters, determining a level to which a physical process input to one or more of the equipment of the plurality of equipment is to be modified to cause the industrial plant to operate within the threshold parameters; and transmitting instructions to cause an operation of the physical process to be modified to the determined level, and wherein the physical process is flow of steam to one or more of the equipment of the plurality of equipment, wherein the level to which the physical process is to be modified comprises a change in a flow rate at which the steam is flowed to the one or more of the equipment of the plurality of equipment.

22. A non-transitory computer-readable medium storing instructions executable by one or more computers to perform operations comprising:

in an industrial plant implementing steam and power systems, the industrial plant comprising a plurality of equipment comprising a cogeneration system and a steam turbine:

for each equipment of the plurality of equipment:

receiving, by a computer system and during operation of each equipment, measured operational physical parameter values output by the equipment during the operation of the equipment, determining, by the computer system, and using the received operational physical parameter values, mass balance and energy balance parameters associated with the equipment, and validating, by the computer system, an operation of the equipment using the determined mass balance and energy balance parameters; and after validating mass balance and energy balance parameters for the plurality of equipment:

determining, by the computer system and using determined mass balance and energy balance parameters for each equipment of the plurality of equipment, mass balance and energy balance parameters associated with the industrial plant, and validating, by the computer system, an operation of the industrial plant using the determined mass balance and energy balance parameters associated with the industrial plant, wherein, for each equipment of the plurality of equipment, validating the operation of the equipment using the determined mass balance and energy balance parameters is implemented as a level in a multi-level validation process, wherein the multi-level validation process further comprises verifying that each measured operational physical parameter value output by the equipment during the operation of the equipment is within a threshold physical parameter value range associated with the equipment, wherein the multi-level validation process further comprises comparing each measured operational physical parameter value output by the equipment during the operation of the equipment with stored historical data comprising historically measured operational physical parameter values output during past operations of the equipment, wherein the multi-level validation process further comprises, based on a result of verifying that each measured operational physical parameter value output by the equipment during the operation of the equipment is within the threshold physical parameter value range associated with the equipment, and based on comparing each measured operational physical parameter value output by the equipment during the operation of the equipment with stored historical data comprising historically measured operational physical parameter values output during past operations of the equipment, classifying each measured operational physical parameter value as a value that accurately represents an operational state of the equipment or as a value that comparatively less accurately represents the operational state of the equipment, wherein validating the operation of the industrial plant using the determined mass balance and energy balance parameters associated with the industrial plant comprises:

determining, using the mass balance and energy balance parameters associated with the industrial plant, that the industrial plant is operating outside threshold parameters associated with the industrial plant;

in response to determining that the industrial plant is operating outside the threshold parameters, determining a level to which a physical process input to one or more of the equipment of the plurality of equipment is to be modified to cause the industrial plant to operate within the threshold parameters; and transmitting instructions to cause an operation of the physical process to be modified to the determined level, and wherein the physical process is flow of steam to one or more of the equipment of the plurality of equipment, wherein the level to which the physical process is to be modified comprises a change in a flow rate at which the steam is flowed to the one or more of the equipment of the plurality of equipment.

23. A system comprising:

one or more computers; and a computer-readable medium storing instructions executable by one or more computers to perform operations comprising:

in an industrial plant implementing steam and power systems, the industrial plant comprising a plurality of equipment comprising a cogeneration system and a steam turbine:

for each equipment of the plurality of equipment:

receiving, by a computer system and during operation of each equipment, measured operational physical parameter values output by the equipment during the operation of the equipment, determining, by the computer system, and using the received operational physical parameter values, mass balance and energy balance parameters associated with the equipment, and validating, by the computer system, an operation of the equipment using the determined mass balance and energy balance parameters; and after validating mass balance and energy balance parameters for the plurality of equipment:

determining, by the computer system and using determined mass balance and energy balance parameters for each equipment of the plurality of equipment, mass balance and energy balance parameters associated with the industrial plant, and validating, by the computer system, an operation of the industrial plant using the determined mass balance and energy balance parameters associated with the industrial plant, wherein, for each equipment of the plurality of equipment, validating the operation of the equipment using the determined mass balance and energy balance parameters is implemented as a level in a multi-level validation process, wherein the multi-level validation process further comprises verifying that each measured operational physical parameter value output by the equipment during the operation of the equipment is within a threshold physical parameter value range associated with the equipment, wherein the multi-level validation process further comprises comparing each measured operational physical parameter value output by the equipment during the operation of the equipment with stored historical data comprising historically measured operational physical parameter values output during past operations of the equipment, wherein the multi-level validation process further comprises, based on a result of verifying that each measured operational physical parameter value output by the equipment during the operation of the equipment is within the threshold physical parameter value range associated with the equipment, and based on comparing each measured operational physical parameter value output by the equipment during the operation of the equipment with stored historical data comprising historically measured operational physical parameter values output during past operations of the equipment, classifying each measured operational physical parameter value as a value that accurately represents an operational state of the equipment or as a value that comparatively less accurately represents the operational state of the equipment, wherein validating the operation of the industrial plant using the determined mass balance and energy balance parameters associated with the industrial plant comprises:

determining, using the mass balance and energy balance parameters associated with the industrial plant, that the industrial plant is operating outside threshold parameters associated with the industrial plant;

in response to determining that the industrial plant is operating outside the threshold parameters, determining a level to which a physical process input to one or more of the equipment of the plurality of equipment is to be modified to cause the industrial plant to operate within the threshold parameters; and transmitting instructions to cause an operation of the physical process to be modified to the determined level, and wherein the physical process is flow of steam to one or more of the equipment of the plurality of equipment, wherein the level to which the physical process is to be modified comprises a change in a flow rate at which the steam is flowed to the one or more of the equipment of the plurality of equipment.

\* \* \* \* \*